(12) United States Patent
Swager et al.

(10) Patent No.: US 11,654,404 B2
(45) Date of Patent: May 23, 2023

(54) LIGHT EMITTING DROPLETS AND RELATED METHODS

(71) Applicant: Massachusetts Institute of Technology, Cambridge, MA (US)

(72) Inventors: Timothy M. Swager, Newton, MA (US); Sara N. Nagelberg, Somerville, MA (US); Mathias Kolle, Hull, MA (US); Lukas Zeininger, Berlin (DE); Kent Harvey, South Boston, MA (US); Myles Herbert, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1017 days.

(21) Appl. No.: 16/415,353

(22) Filed: May 17, 2019

(65) Prior Publication Data
US 2019/0388849 A1 Dec. 26, 2019

Related U.S. Application Data

(60) Provisional application No. 62/673,506, filed on May 18, 2018.

(51) Int. Cl.
*B01F 23/41* (2022.01)
*B01L 3/00* (2006.01)
(Continued)

(52) U.S. Cl.
CPC .............. *B01F 23/41* (2022.01); *B01F 25/14* (2022.01); *B01L 3/502784* (2013.01);
(Continued)

(58) Field of Classification Search
CPC ...... B01F 23/41; B01F 25/14; B01F 23/4145; B01L 3/502784; G01N 21/1717;
(Continued)

(56) References Cited

U.S. PATENT DOCUMENTS

| 3,864,044 A | 2/1975 | Lyshkow |
| 6,162,052 A * | 12/2000 | Kokubu ................. A61B 18/22 |
| | | 433/29 |

(Continued)

FOREIGN PATENT DOCUMENTS

| EP | 0569922 A1 | 11/1993 |
| WO | WO 2016/070027 A1 | 5/2016 |

OTHER PUBLICATIONS

International Search Report and Written Opinion for Application No. PCT/US2019/032768 dated Aug. 5, 2019.
(Continued)

*Primary Examiner* — Edwin C Gunberg
*Assistant Examiner* — Gisselle M Gutierrez
(74) *Attorney, Agent, or Firm* — Wolf, Greenfield & Sacks, P.C.

(57) ABSTRACT

Embodiments described herein may be useful for optofluidic devices. For example, optofluidic devices using dynamic fluid lens materials represent an ideal platform to create versatile, reconfigurable, refractive optical components. For example, the articles described herein may be useful as fluidic tunable compound micro-lenses. Such compound micro-lenses may be composed of two or more components (e.g., two or more inner phases) that form stable bi-phase emulsion droplets in outer phases (e.g., aqueous media). In some embodiments, the articles described herein may be useful as light emitting droplets. Advantageously, the plurality of droplets may be configured such that light rays may modified (e.g., via stimulation of the droplets, exposure to an analyte such as a pathogen) to have a detectable emission intensity and/or angle of maximum emission intensity under a particular set of conditions.

9 Claims, 48 Drawing Sheets

(51) Int. Cl.

| | | |
|---|---|---|
| *B01F 25/00* | (2022.01) | |
| *G01N 21/17* | (2006.01) | |
| *G01N 21/25* | (2006.01) | |
| *G01N 21/59* | (2006.01) | |
| *G01N 21/47* | (2006.01) | |
| *G01N 21/55* | (2014.01) | |

(52) U.S. Cl.
CPC ......... *G01N 21/1717* (2013.01); *G01N 21/25* (2013.01); *G01N 21/59* (2013.01); *B01F 23/4145* (2022.01); *G01N 21/47* (2013.01); *G01N 21/55* (2013.01)

(58) Field of Classification Search
CPC ........ G01N 21/25; G01N 21/59; G01N 21/47; G01N 21/55; B01J 13/0004
See application file for complete search history.

(56) References Cited

U.S. PATENT DOCUMENTS

| | | | |
|---|---|---|---|
| 2010/0062525 A1 | 3/2010 | Abbott et al. | |
| 2012/0019760 A1 | 1/2012 | Timusk et al. | |
| 2013/0141895 A1 | 6/2013 | Alpaslan et al. | |
| 2014/0227684 A1 | 8/2014 | Hindson et al. | |
| 2014/0336039 A1* | 11/2014 | Cohen | C09D 5/006 502/159 |
| 2016/0151753 A1 | 6/2016 | Swager et al. | |
| 2016/0151756 A1* | 6/2016 | Swager | B01J 13/00 516/53 |
| 2018/0246314 A1 | 8/2018 | Swager et al. | |

OTHER PUBLICATIONS

Amato et al., Functional Microcapsules via Thiol-Ene Photopolymerization in Droplet-Based Microfluidics. ACS Appl Mater Interfaces. Feb. 1, 2017;9(4):3288-93. doi: 10.1021/acsami.6b16382. Epub Jan. 20, 2017.

Chen et al., Shape-Tunable Synthesis of Sub-Micrometer Lens-Shaped Particles via Seeded Emulsion Polymerization. Chem Mater. Mar. 17, 2017;29(7):2685-8. doi: 10.1021/acs.chemmater.7b00494.

Lee et al., Fluorocarbon Oil Reinforced Triple Emulsion Drops. Adv Mater. Oct. 2016;28(38):8425-30. doi: 10.1002/adma.201602804. Epub Aug. 1, 2016.

International Search Report and Written Opinion for Application No. PCT/US2018/016605 dated May 9, 2018.

International Preliminary Report on Patentability for Application No. PCT/US2018/016605 dated Aug. 15, 2019.

Aarts et al., Direct visual observation of thermal capillary waves. Science. May 7, 2004;304(5672):847-50.

Axthelm et al., Fluorinated Boronic Acid-Appended Pyridinium Salts and 19F NMR Spectroscopy for Diol Sensing. J. Am. Chem. Soc. Jul. 18, 2017;139:11413-20.

Baret et al., Kinetic aspects of emulsion stabilization by surfactants: A microfluidic analysis. Langmuir. Jun. 2, 2009;25(11):6088-93. doi: 10.1021/la9000472. Epub Mar. 18, 2009.

Berge et al., Variable focal lens controlled by an external voltage: An application of electrowetting. Eur Phys J E:Soft Matter and Biological Physics. Oct. 2000;3(2):159-163.

Blaszczak et al., Direct observation of light focusing by single photoreceptor cell nuclei. Opt Express. May 2014;22(9):11043-60. doi: 10.1364/OE.22.011043.

Braslau et al., Surface roughness of water measured by x-ray reflectivity. Phys Rev Lett. Jan. 14, 1985;54(2):114-117.

Bull et al., Exploiting the reversible covalent bonding of boronic acids: recognition, sensing, and assembly. Acc. Chem. Res. 2013;46:312-26. Epub Nov. 14, 2012.

Chen et al., Honeycomb-patterned film segregated with phenylboronic acid for glucose sensing. Langmuir. Sep. 7, 2011;27:12597-605.

Chen et al., Variable-focusing microlens with microfluidic chip. J Micromech Microengineering. May 2004;14(5):675-80.

Chevalier et al., Pumping-out photo-surfactants from an air-water interface using light. Soft Matter. Sep. 2011;7:7866-74. Epub Jul. 29, 2011.

Choi et al., One step formation of controllable complex emulsions: from functional particles to simultaneous encapsulation of hydrophilic and hydrophobic agents into desired position. Adv. Mater. 2013;25:2536-41.

Chronis et al., Tunable liquid-filled microlens array integrated with microfluidic network. Opt Express. Sep. 22, 2003;11(19):2370-8.

Davies et al., Design and analysis of an image transfer system using microlens arrays. Opt Eng. Nov. 1, 1994;33(11):3624-33.

Disney et al., Detection of bacteria with carbohydrate-functionalized fluorescent polymers. J. Am. Chem. Soc. 2004;126:13343-6. Epub Sep. 25, 2004.

Dong et al., Adaptive liquid microlenses activated by stimuli-responsive hydrogels. Nature. Aug. 3, 2006;442(7102):551-4.

Dong et al., Tunable and movable liquid microlens in situ fabricated within microfluidic channels. Appl Phys Lett. 2007;91(4):41109(1-3).

Duval et al., Key steps towards the oriented immobilization of antibodies using boronic acids. Analyst. 2015;140:6467-72. Epub Aug. 10, 2015.

Erdmann et al., High-resolution digital integral photography by use of a scanning microlens array. Appl Opt. Nov. 1, 2001;40(31):5592-9.

Garcia-Amoros et al., Recent advances towards azobenzene-based light-driven real-time information-transmitting materials. Beilstein J Org Chem. 2012;8:1003-17. Epub Jul. 4, 2012.

Grilli et al., Liquid micro-lens array activated by selective electrowetting on lithium niobate substrates. Opt Express. May 26, 2008;16(11):8084-93.

Guzowski et al., The structure and stability of multiple microdroplets. Soft Matter. 2012;8:7269-78. Epub Jun. 11, 2012.

Hornbeck, Digital Light Processing for high-brightness high-resolution applications. Proc SPIE 3013, Projection Displays III, Electronic Imaging '97. May 8, 1997. pp. 27-40.

James et al., Chiral discrimination of monosaccharides using a fluorescent molecular sensor. Nature. Mar. 23, 1995;374:345-7.

James et al., Saccharide sensing with molecular receptors based on boronic acid. Angewandte Chemie International Ed. 1996;35:1910-22.

Jeong et al., Tunable microdoublet lens array. Opt Express. May 31, 2004;12(11):2494-500.

Kanayama et al., Interfacial recognition of sugars by boronic acid-carrying self-assembled monolayer. Langmuir. 2000;16:577-83.

Karp et al., Planar micro-optic solar concentrator. Opt Express. Jan. 18, 2010;18(2):1122-33.

Kato et al., The role of carbohydrates in infection strategies of enteric pathogens. Tropical Medicine and Health. 2015;43(1):51-52.

Kienzler et al., A red-shifted, fast-relaxing azobenzene photoswitch for visible light control of an ionotropic glutamate receptor. J Am Chem Soc. Nov. 27, 2013;135(47):17683-6. doi: 10.1021/ja408104w. Epub Oct. 30, 2013.

Kim et al., Label-free biosensing with hydrogel microlenses. Angew Chem Int Ed Engl. Feb. 2006;45(9):1446-9.

Kisiela et al., Functional characterization of the FimH adhesion from *Salmonella enterica* serovar Enteritidis. Microbiology. 2006;152:1337-46.

Klajn et al., Writing self-erasing images using metastable nanoparticle "inks". Angew Chem Int Ed Engl. 2009;48(38):7035-9.

Kovalchuk et al., Studies in capillary pressure tensiometry and interfacial dilational rheology. In Bubble and Drop Interfaces, Eds. Miller & Liggeri., Koninklijke Brill NV, Leiden, 2011. pp. 143-178.

Kreysing et al., Physical insight into light scattering by photoreceptor cell nuclei. Opt Lett. Aug. 1, 2010;35(15):2639-41. doi: 10.1364/OL.35.002639.

Krogmann et al., A MEMS-based variable micro-lens system. J Opt A: Pure Appl Opt. May 2006;8(7):S330-6.

Krupenkin et al., Tunable liquid microlens. Appl Phys Lett. Jan. 20, 2003;82(3):316-8.

Kuiper et al., Variable-focus liquid lens for miniature cameras. Appl Phys Lett. Aug. 16, 2004;85(7):1128-30.

(56) References Cited

OTHER PUBLICATIONS

Kuswandi et al., Optical sensing systems for microfluidic devices: A review. Anal Chim Acta. Oct. 10, 2007;601(2):141-55. Epub Sep. 1, 2007.
Li et al., Electrowetting-driven variable-focus microlens on flexible surfaces. Appl Phys Lett. Jun. 4, 2012;100(23):231105(1-4). Epub Jun. 5, 2012.
Li et al., Optofluidic dye lasers. Microfluid Nanofluid. Jan. 2008;4(1-2):145-58.
Lin et al., Fabrication of oriented antibody-conjugated magnetic nanoprobes and their immunoaffinity application. Analytical Chem. Nov. 1, 2009;81:8774-82.
Lis et al., Lectins: carbohydrate-specific proteins that mediate cellular recognition. Chem. Rev. 1998;98:637-74. Epub Mar. 19, 1998.
Lorand et al., Polyol complexes and structure of the benzeneboronate ion. J. Org. Chem. Jun. 1959;24:769-74.
Mahimwalla et al., Azobenzene photomechanics: Prospects and potential applications. Polym Bull. Jun. 2012;69:967-1006.
Martinez-Cuenca et al., Extended depth-of-field 3-D display and visualization by combination of amplitude-modulated micro lenses and deconvolution tools. J Display Technol. Dec. 2005;1(2):321-7.
Matsumoto et al., Noninvasive sialic acid detection at cell membrane by using phenylboronic acid modified self-assembled monolayer gold electrode. J. Am. Chem. Soc. 2009;131:12022-3. Epub Aug. 10, 2009.
McClain et al., Interfacial roughness in a near-critical binary fluid mixture: X-ray reflectivity and near-specular diffuse scattering. Eur Phys J B:—Condens Matter Complex Syst. May 1999;10(1):45-52.
McDonald et al. Low-cost optical manipulation using hanging droplets of PDMS. RSC Adv. 2015;5:55561-5. Epub Jun. 17, 2015.
Miccio et al., Tunable liquid microlens arrays in electrode-less configuration and their accurate characterization by interference microscopy. Opt Express. Feb. 16, 2009;17(4):2487-99.
Mishra et al., Optofluidic lens with tunable focal length and asphericity. Sci Rep. Sep. 16, 2014;4:6378(1-4). doi: 10.1038/srep06378.
Murade et al., High speed adaptive liquid microlens array. Opt Express. Jul. 30, 2012;20(16):18180-7. doi: 10.1364/OE.20.018180.
Nagelberg et al., Reconfigurable and responsive droplet-based compound micro-lenses. Nat Commun. Mar. 7, 2017;8:14673(1-9). doi: 10.1038/ncomms14673.
Nagelberg, Tunable Liquid Microlenses formed from Dynamically Re-Configurable Double Emulsions. Thesis submitted to the Department of Mechanical Engineering, Massachusetts Institute of Technology in Jun. 2015. 40 pages.
Ng et al., Light field photography with a hand-held plenoptic camera. Stanford Tech Report, CTSR Feb. 2005, 11 pages, available at graphics.stanford.edu/papers/lfcamera/lfcamera-150dpi.pdf.
Oskooi et al., MEEP: A flexible free-software package for electromagnetic simulations by the FDTD method. Comput Phys Commun. 2010;181(3):687-702. Epub Nov. 20, 2009.
Pal et al., Design, synthesis, and screening of a library of peptidyl bis (boroxoles) as oligosaccharide receptors in water: identification of a receptor for the tumor marker TF-antigen disaccharide. Angewandte Chemie International Ed. 2010;49:1492-5.
Popovic et al., Technique for monolithic fabrication of microlens arrays. Appl Opt. Apr. 1, 1988;27(7):1281-4.
Ren et al., Effects of gravity on the shape of liquid droplets. Opt Commun. 2010;283(17):3255-8.
Ren et al., Tunable-focus liquid lens controlled using a servo motor. Opt Exp. Sep. 4, 2006;14(18):8031-6.
Ren et al., Tunable-focus liquid microlens array using dielectrophoretic effect. Opt Exp. Feb. 2008;16(4):2646-52.
Schofield et al., Synthetic GPI as a candidate anti-toxic vaccine in a model of malaria. Nature. Aug. 15, 2002;418:785.9.
Shang et al., Photoresponsive surfactants exhibiting unusually large, reversible surface tension changes under varying illumination conditions. Langmuir. 2003;19:10764-73.
Shi et al., Tunable optofluidic microlens through active pressure control of an air-liquid interface. Microfluid Nanofluid. Aug. 2010;9(2-3):313-8.
Solovei et al., Nuclear architecture of rod photoreceptor cells adapts to vision in mammalian evolution. Cell. Apr. 17, 2009;137(2):356-68. doi: 10.1016/j.cell.2009.01.052.
Tang et al., Dynamically reconfigurable liquid-core liquid-cladding lens in a microfluidic channel. Lab Chip. Mar. 2008;8(3):395-401. doi: 10.1039/b717037h. Epub Jan. 14, 2008.
Thanassi et al., Surface organelles assembled by secretion systems of Gram-negative bacteria: diversity in structure and function. FEMS Microbiol. Rev. 2012;36(6):1046-82. Author Manuscript, 58 pages.
Wang et al., Liquid crystals: Emerging materials for use in real-time detection applications. J Mater Chem C. 2015;3(35):9038-47. Epub Aug. 4, 2015.
Wang et al., Synthetic aperture integral imaging display with moving array lenslet technique. J Display Technol. Oct. 2015;11(10):827-833.
Werber et al., Tunable microfluidic microlenses. Appl Opt. Jun. 1, 2005;44(16):3238-45.
Wu et al., Selective sensing of saccharides using simple boronic acids and their aggregates. Chem. Soc. Rev. 2013;42:8032-48. Epub Jul. 16, 2013.
Xiao et al., Advances in three-dimensional integral imaging: Sensing, display, and applications [Invited]. Appl Opt. Feb. 1, 2013;52(4):546-60. doi: 10.1364/AO.52.000546. Epub Jan. 24, 2013.
Zarzar et al., Dynamically reconfigurable complex emulsions via tunable interfacial tensions. Nature. Feb. 26, 2015;518(7540):520-4. 20 pages.
Zarzar et al., Optical visualization and quantification of enzyme activity using dynamic droplet lenses. Proc. Natl. Acad. Sci. Apr. 11, 2017;114:3821-5.
Zeng et al., Fiber endoscopes utilizing liquid tunable-focus microlenses actuated through infrared light. J Microelectromechan Syst. Jun. 2011;20(3):583-93.
Zeng et al., Liquid tunable microlenses based on MEMS techniques. J Phys D Appl Phys. Aug. 14, 2013;46(32):323001. 48 pages.
Zeng et al., Tunable microlens arrays actuated by various thermo-responsive hydrogel structures. J Micromechan Microeng. Oct. 25, 2010;20(11):115035(1-11).
Zhang et al., Janus Emulsion for the Detection of Bacteria. ACS Central Science. Mar. 23, 2017;3:309-13.
Zhang et al., Wafer-scale fabricated thermo-pneumatically tunable microlenses. Light Sci Appl. 2014;3(2):e145(1-6).
International Preliminary Report on Patentability for Application No. PCT/US2019/032768 dated Dec. 3, 2020.

\* cited by examiner

LIGHT EMITTING DROPLETS AND RELATED METHODS

RELATED APPLICATIONS

This application claims priority under 35 U.S.C. § 119(e) to U.S. Provisional Application Ser. No. 62/673,506, filed May 18, 2018, entitled "TUNABLE MICROLENSES AND RELATED METHODS," which is incorporated herein by reference in its entirety.

GOVERNMENT SUPPORT

This invention was made with Government support under Grant No. DMR1533985 awarded by the National Science Foundation (NSF). The Government has certain rights in the invention.

FIELD OF THE INVENTION

The present invention generally relates to light emitting droplets and related methods.

BACKGROUND

Emulsification is a powerful age-old technique for mixing and dispersing immiscible inner phases within a continuous liquid phase. Consequently, emulsions are central components of medicine, food, and performance materials. Complex emulsions, including multiple emulsions and Janus droplets, are of increasing importance in pharmaceuticals and medical diagnostics, in the fabrication of microdroplets and capsules for food, in chemical separations, for cosmetics, and for performance materials like paints and coatings. As complex emulsion properties and functions are generally related to droplet geometry and composition, the development of rapid and facile fabrication approaches allowing precise control over the droplets' physical and chemical characteristics is critical. Significant advances in the fabrication of complex emulsions have been accomplished by a number of procedures, ranging from large-scale less precise techniques that give compositional heterogeneity using high-shear mixers and membranes to small-volume microfluidic methods. However, such approaches have yet to create droplet morphologies that can be controllably altered after emulsification.

SUMMARY OF THE INVENTION

The present invention provides light emitting droplets and related methods.

In one aspect, articles are provided. In some embodiments, the article comprises a plurality of droplets dispersed within an outer phase, wherein the plurality of droplets comprise a first component and a second component immiscible with the first component under a particular set of conditions, at least a first portion of the plurality of droplets has a first average focal length for transmitted or reflected light, and at least a second portion of the plurality of droplets has a second average focal length for transmitted or reflected light, different than the first average focal length.

In some embodiments, the article comprises a plurality of droplets dispersed within an outer phase, wherein the plurality of droplets comprise a first component and a second component immiscible with the first component under a particular set of conditions, at least a first portion of the plurality of droplets has a first radius of curvature between the first component and the second component that causes light rays to focus, and at least a second portion of the plurality of droplets has a second radius of curvature between the first component and the second component that causes light rays to focus, different than the first radius of curvature.

In some embodiments, the article comprises a plurality of droplets dispersed within an outer phase, wherein the plurality of droplets comprise a first component and a second component immiscible with the first component under a first set of conditions, the plurality of droplets have a first average focal length for transmitted or reflected light under the first set of conditions, and the plurality of droplets have a second average focal length for transmitted or reflected light different than the first average focal length under a second set of conditions, different than the first set of conditions.

In some embodiments, the article comprises a plurality of droplets dispersed within an outer phase, wherein the plurality of droplets comprise a first component and a second component immiscible with the first component under a first set of conditions, the plurality of droplets have a first average radius of curvature between the first component and the second component that causes light rays to focus under the first set of conditions, and the plurality of droplets have a second average radius of curvature between the first component and the second component that causes light rays to focus under a second set of conditions, different than the first set of conditions.

In some embodiments, the article comprises a plurality of droplets dispersed within an outer phase, wherein the plurality of droplets comprise a first component and a second component immiscible with the first component under a first set of conditions, the plurality of droplets have a first average radius of curvature between the first component and the second component that causes light rays to have a first emission intensity at a given emission direction under the first set of conditions, and the plurality of droplets have a second average radius of curvature between the first component and the second component that causes light rays to have a second emission intensity at the given emission direction, different than the first emission intensity, under a second set of conditions, different than the first set of conditions.

In some embodiments, the article comprises a plurality of droplets dispersed within an outer phase, wherein the plurality of droplets comprise a first component and a second component immiscible with the first component under a first set of conditions, the plurality of droplets have a first average radius of curvature between the first component and the second component that causes light rays to have a first angle of maximum emission intensity under the first set of conditions, and the plurality of droplets have a second average radius of curvature between the first component and the second component that causes light rays to have a second angle of maximum emission intensity, different than the first angle, under a second set of conditions, different than the first set of conditions.

In another aspect, methods are provided. In some embodiments, the method comprises providing a plurality of droplets dispersed within an outer phase, wherein the plurality of droplets have a first average radius of curvature between a first component and a second component within the droplets and stimulating the plurality of droplets such that at least a portion of the plurality of droplets has a second average radius of curvature between the first component and the second component, different than the first average radius of curvature.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

according to one set of embodiments.

Figure 5A:
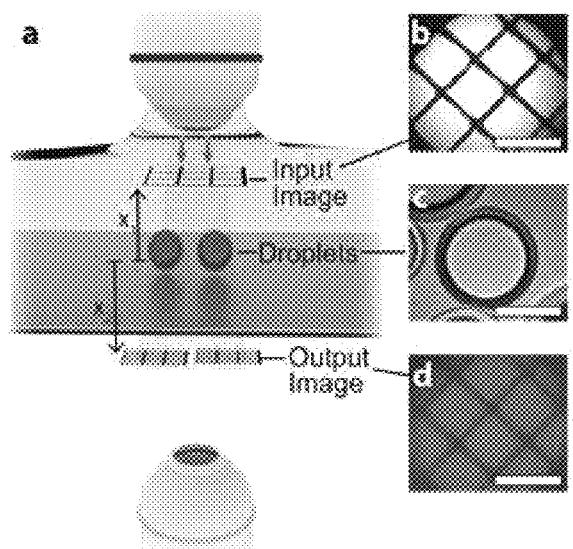
FIG. 5A is a schematic of the optical setup used for focal length and image forming analysis. A grid image was projected in front of the droplets to serve as the object for the micro-lenses. The image formed by the droplets was recorded using a 10× objective, according to one set of embodiments.
Figure 5B:
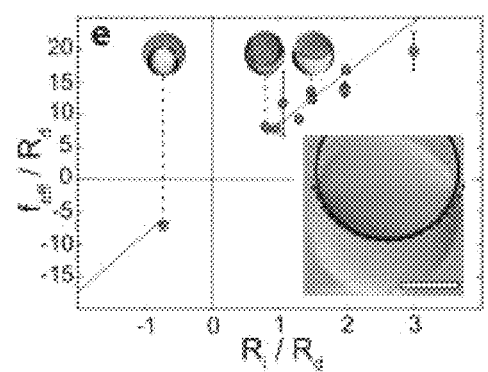
FIG. 5B is a plot of the effective focal length as a function of internal radius of curvature $R_i$, normalized by the droplet diameter $R_d$, according to one set of embodiments.
Figure 5C:
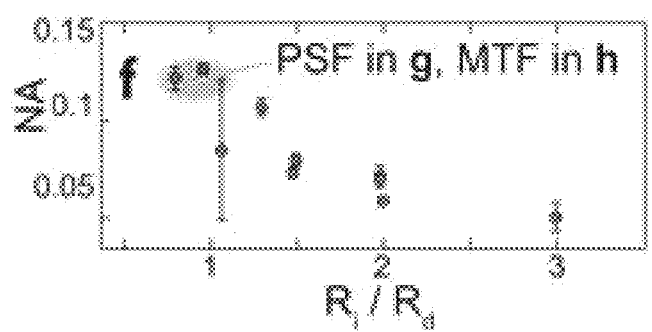
FIG. 5C is a plot of the numerical aperture NA as a function of internal radius of curvature $R_i$, given by $$NA(R_i) = n \sin\left(\tan^{-1}\frac{R_d}{f(R_i)}\right),$$
Figure 5D:
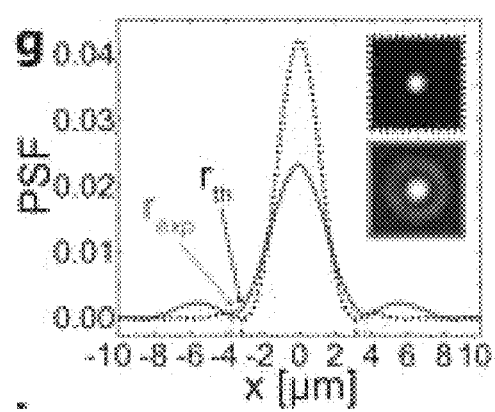

FIG. 5D is a plot of the point spread function estimate (PSF) of droplets with a numerical aperture NA=0.12 for red light, according to one set of embodiments.

Figure 5E:
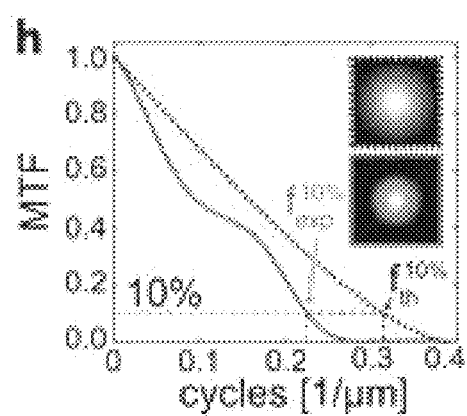

FIG. 5E is a plot of the modulation transfer function (MTF) for the same droplets in FIG. 5D, according to one set of embodiments.

Figures 6A, 6B, 6C:
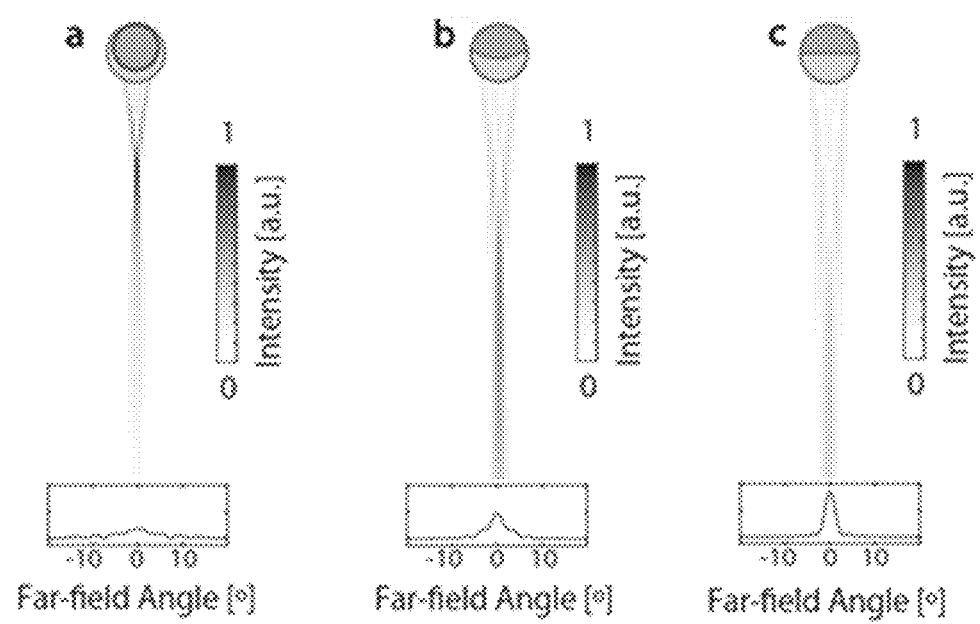

FIGS. 6A-6C are 2D Finite Difference Time Domain simulations of droplets of 5 µm radius for incident light of 500 nm wavelength. The internal radii of curvature are 4 µm (FIG. 6A), 9 µm (FIG. 6B), and infinite (FIG. 6C), according to one set of embodiments.

Figure 6D:
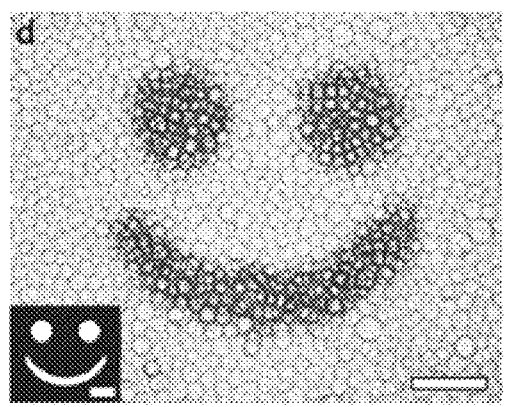

FIG. 6D is an image of localized exposure of droplets including light-sensitive surfactants to UV light, according to one set of embodiments.

Figure 6E:
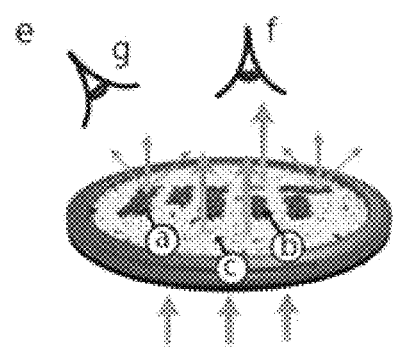
Figure 6F:
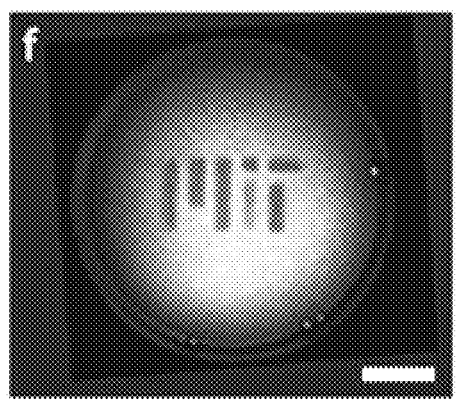
Figure 6G:
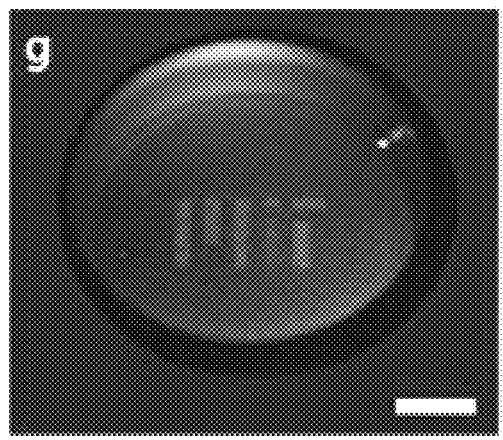

FIG. 6E is a schematic illustration showing two different geometries for observing the photo-patterned droplet films, corresponding to the perceived images shown in FIGS. 6F-6G, according to one set of embodiments.

FIGS. 6F-6G are images of photo-patterned droplets viewed from above (FIG. 6F) and at an angle (FIG. 6G), according to one set of embodiments.

Figure 6H:
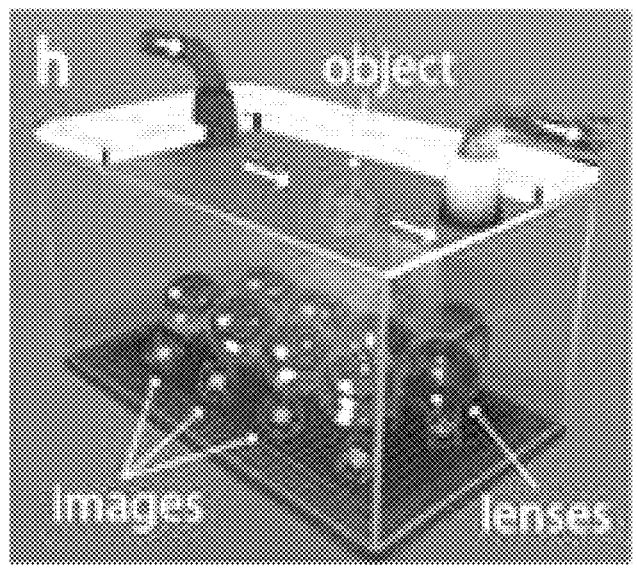

FIG. 6H is a schematic diagram of tomographic imaging of micro-scale objects in a microfluidic system using the fluid compound lenses, according to one set of embodiments.

Figure 6I:
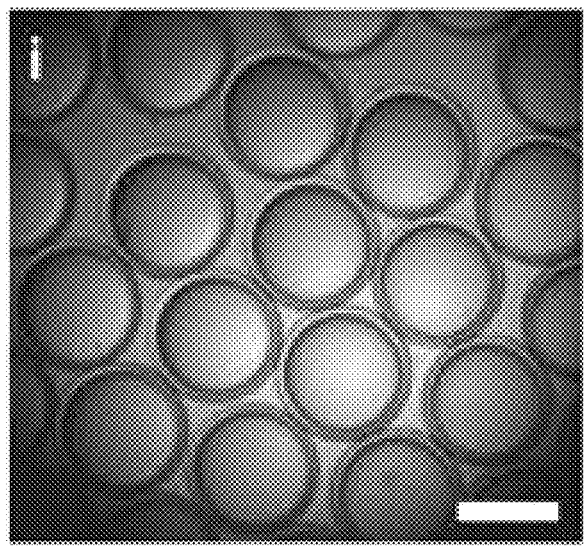

FIG. 6I is a photograph of a monolayer array of fluid compound lenses, according to one set of embodiments.

Figure 6J:
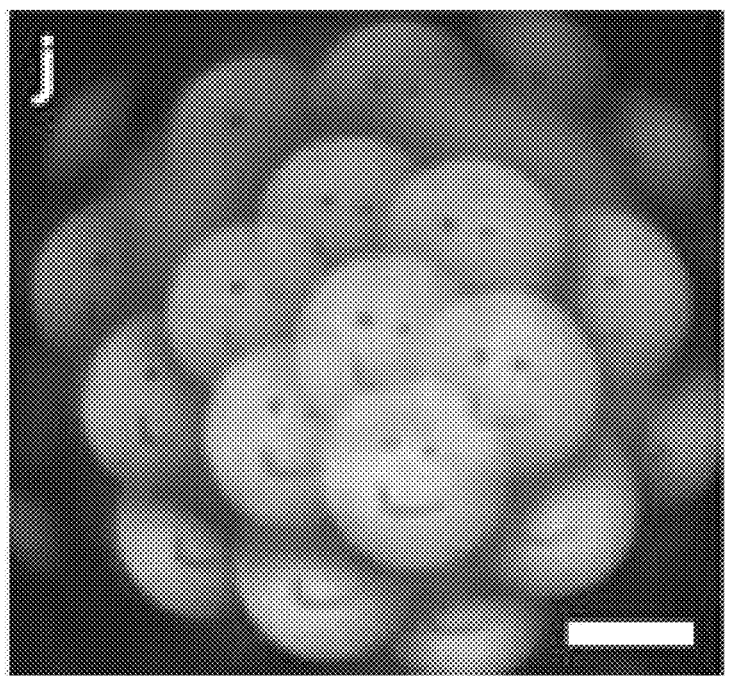

FIG. 6J is a photograph of images projected by the monolayer lenses, according to one set of embodiments.

Figure 7:
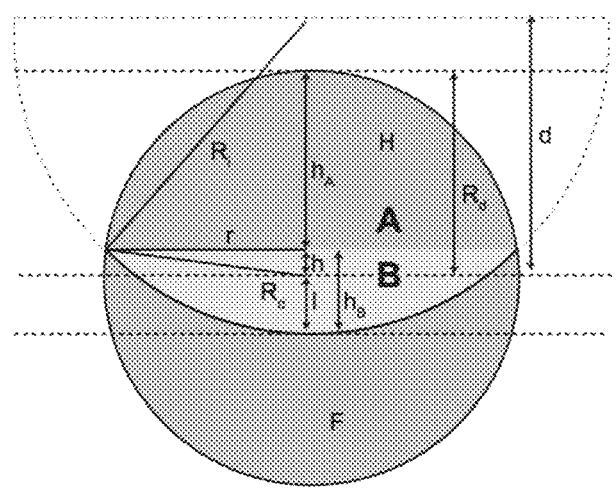

FIG. 7 is schematic diagram of the geometry of an exemplary droplet, according to one set of embodiments.

Figure 8A:
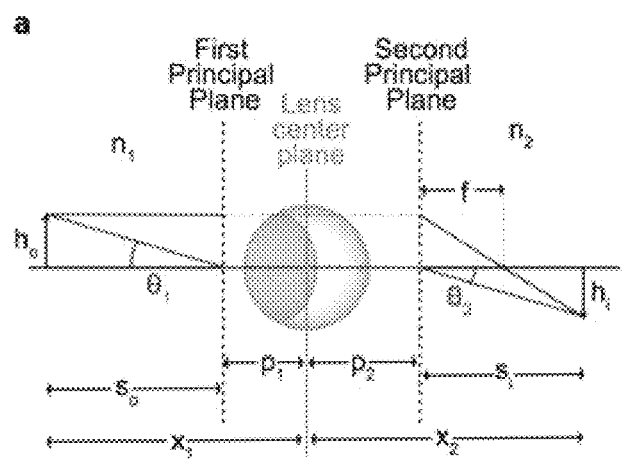

FIG. 8A is a schematic diagram of the determination of the focal length relative to an image location, according to one set of embodiments.

Figure 8B:
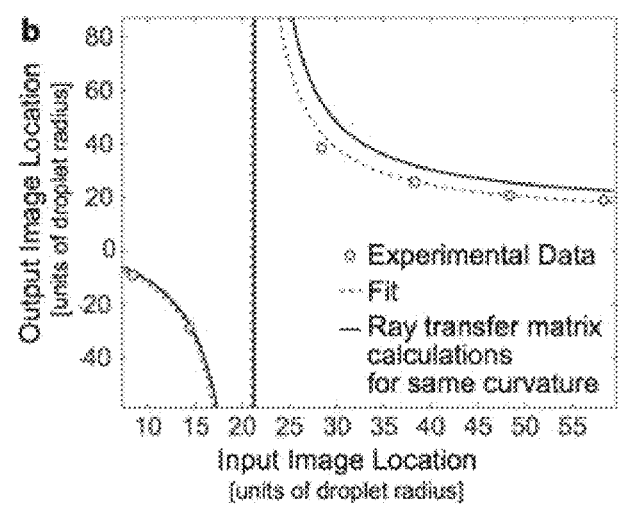

FIG. 8B is an exemplary plot of image location used to determine focal length, according to one set of embodiments.

Figure 9A:
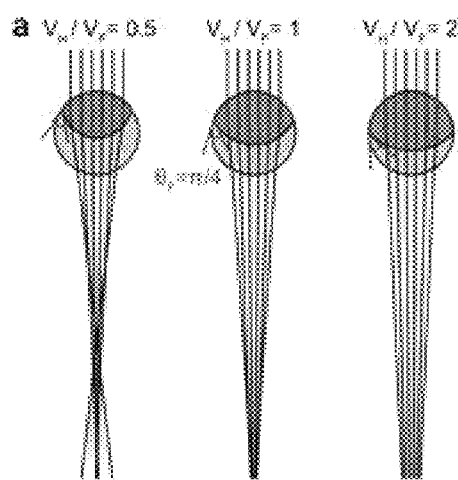

FIG. 9A is a schematic of ray-tracing diagrams for droplets with volume ratios of hydro- to fluorocarbon V_H/V_F=0.5, 1, and 2, where the contact angle measured from the hydrocarbon-fluorocarbon interface to the fluorocarbon-water interface is kept constant at θ_F=π/4, according to one set of embodiments.

Figure 9B:
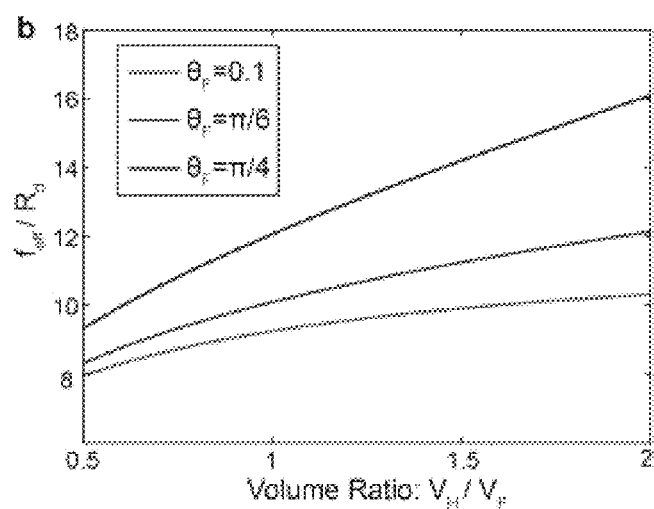

FIG. 9B a plot of the effective focal length in units of droplet radius f_eff/R_d plotted against volume ratio V_H/V_F, for contact angles θ_F of 0.1, π/6, and π/4, according to one set of embodiments.

Figure 10:
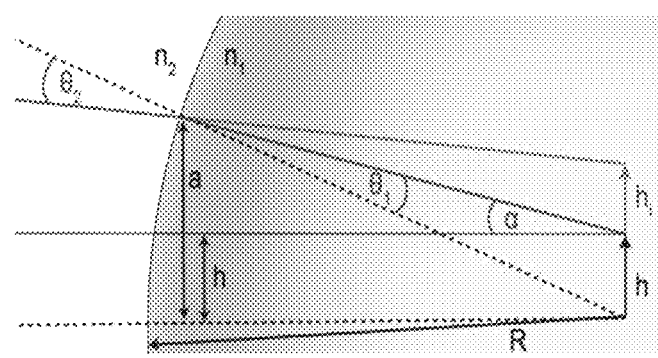

FIG. 10 is a schematic diagram of the location of the image inside of a droplet using the Paraxial Approximation, according to one set of embodiments.

Figure 11A:
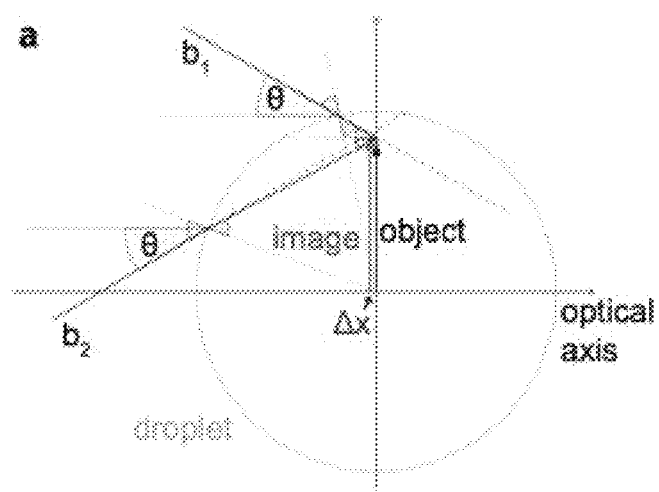

FIG. 11A is a schematic of the Geogebra model used to determine the apparent height of an object located inside a droplet of refractive index n=1.39, according to one set of embodiments.

Figure 11B:
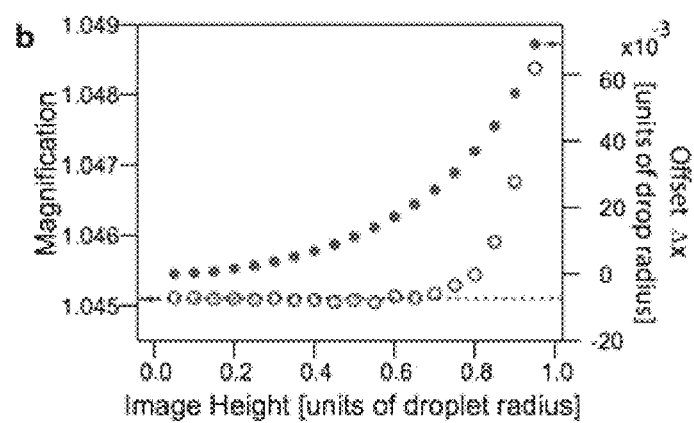

FIG. 11B is a plot of the magnification of the object located inside of the droplet (open circles) and difference in position between object and image Δx (closed circles), according to one set of embodiments.

Figure 12A:
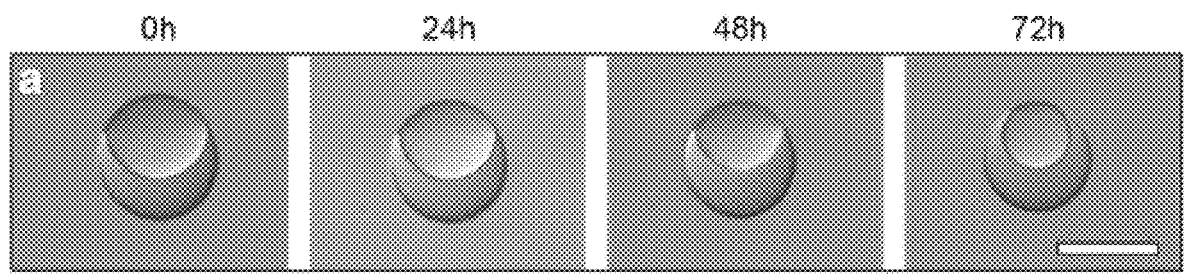
Figure 12B:
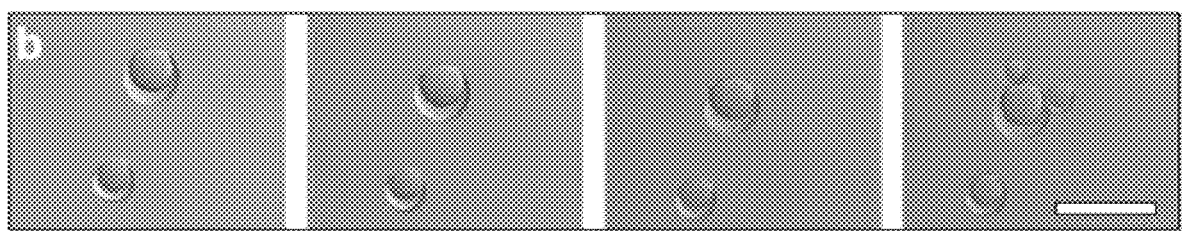

FIGS. 12A-12B are photographs of the variation of droplet morphology composed of heptane and FC770 over time, if diffusion of heptane is not suppressed (FIG. 12A) and where droplet morphologies are stable, if diffusion of heptane is suppressed by enclosing the system and priming the aqueous medium with heptane (FIG. 12B), according to one set of embodiments.

Figure 13A:
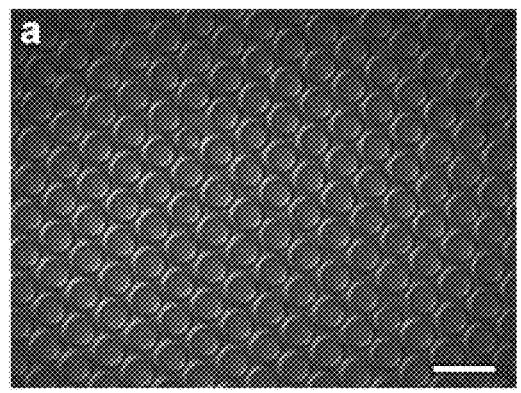

FIG. 13A is a photograph of an array of uniform emulsion droplet lenses, according to one set of embodiments.

Figure 13B:
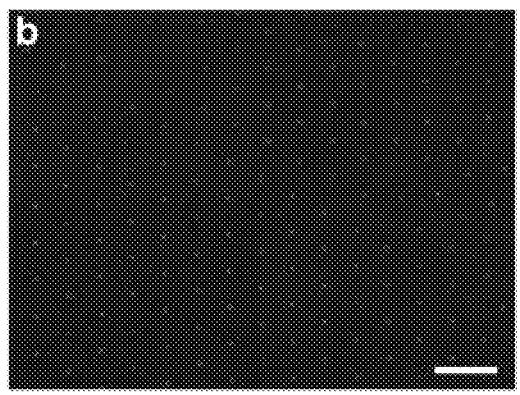

FIG. 13B is a plot of the point spread functions (PSF) of the droplets shown in (FIG. 13A), according to one set of embodiments.

Figure 13C:
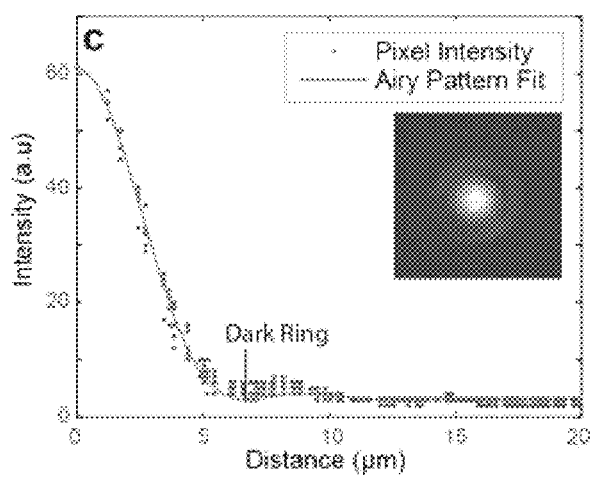

FIG. 13C is a plot of the fit to the Airy disk, according to one set of embodiments.

Figure 13D:
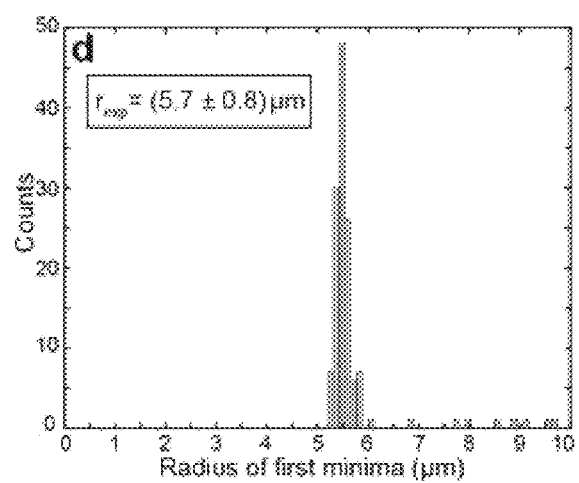
Figures 14A, 14B, 14C, 14D, 14E:
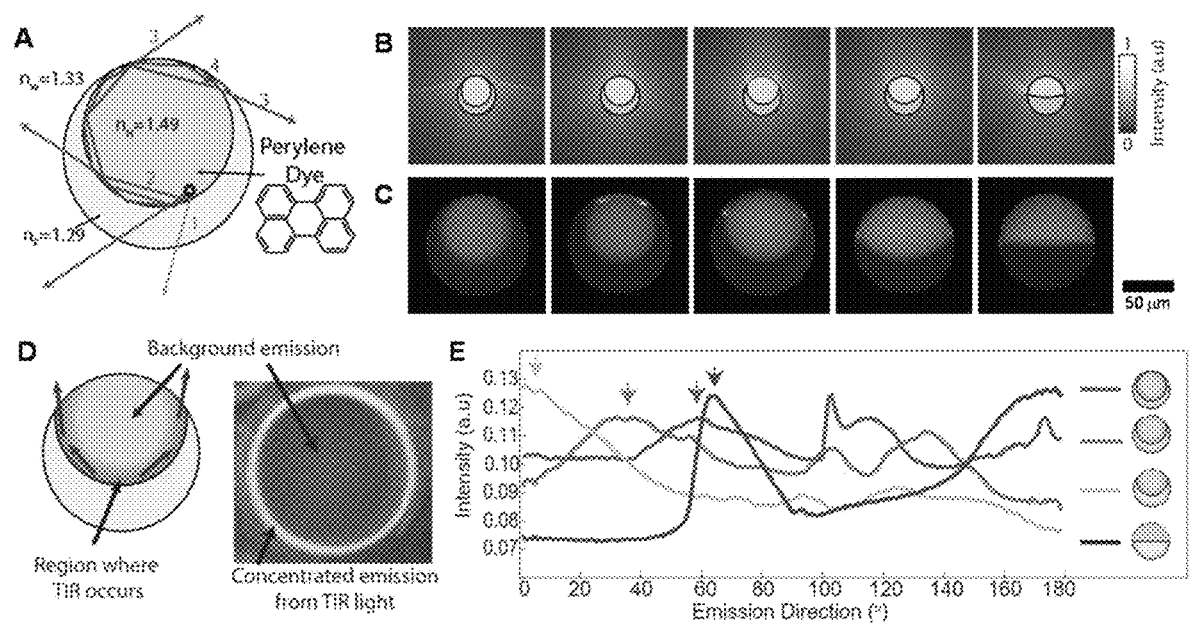

FIG. 13D is a plot of the distribution of the minimum in the Airy pattern, which generally correlates with the Rayleigh two-point resolution limit, according to one set of embodiments.

FIGS. 14A-14E show directional light emission from complex emulsions, according to one set of embodiments. (FIG. 14A) Ray diagram of emission from within the hydrocarbon phase. (FIG. 14B) Intensity distribution around the droplet determined by 2D raytracing. (FIG. 14C) Side-view fluorescence microscope images of the dyed complex emulsions in five different morphologies The higher light intensity at the three-phase contact line represents the TIR light that is directed in different out-coupling angles. Side-view images were taken in higher refractive index continuous phase (RI=1.40) in order to increase the out-coupling angle of light. Dashed lines represent edge of the fluorocarbon phase. (FIG. 14D) Side view diagram showing region of TIR (left) and fluorescence microscope top-view image of a dyed complex emulsion droplet in state where the TIR light is directed upwards (right). (FIG. 14E) Emission intensity in the far field as a function of polar angle measured from the droplets symmetry axis. Arrows indicate the TIR light out-coupled at the three-phase junction.

Figures 15A, 15B:
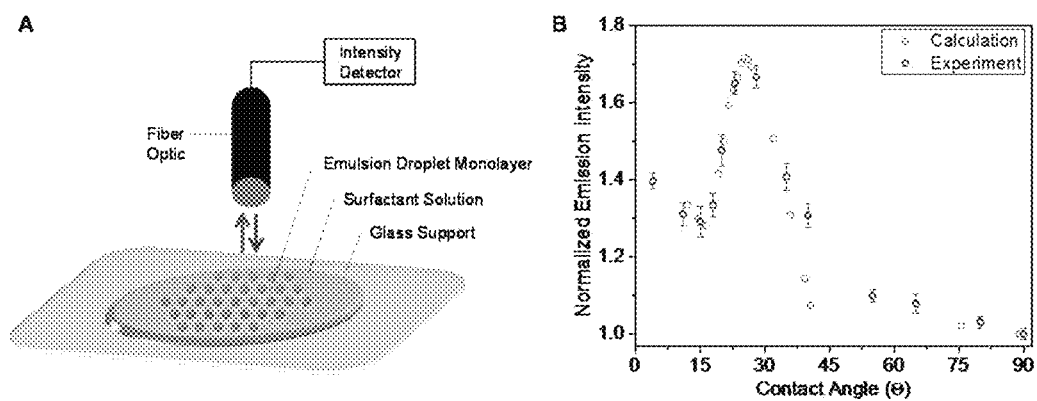

FIGS. 15A-15B show, according to one set of embodiments, (FIG. 15A) Experimental configuration; (FIG. 15B) Calculated and measured emission intensities as a function of the contact angle at the three phase junction above a droplet monolayer, wherein the emission intensity of droplets in the Janus configuration was normalized to 1.0.

Figures 16A, 16B, 16C, 16D, 16E, 16F, 16G:
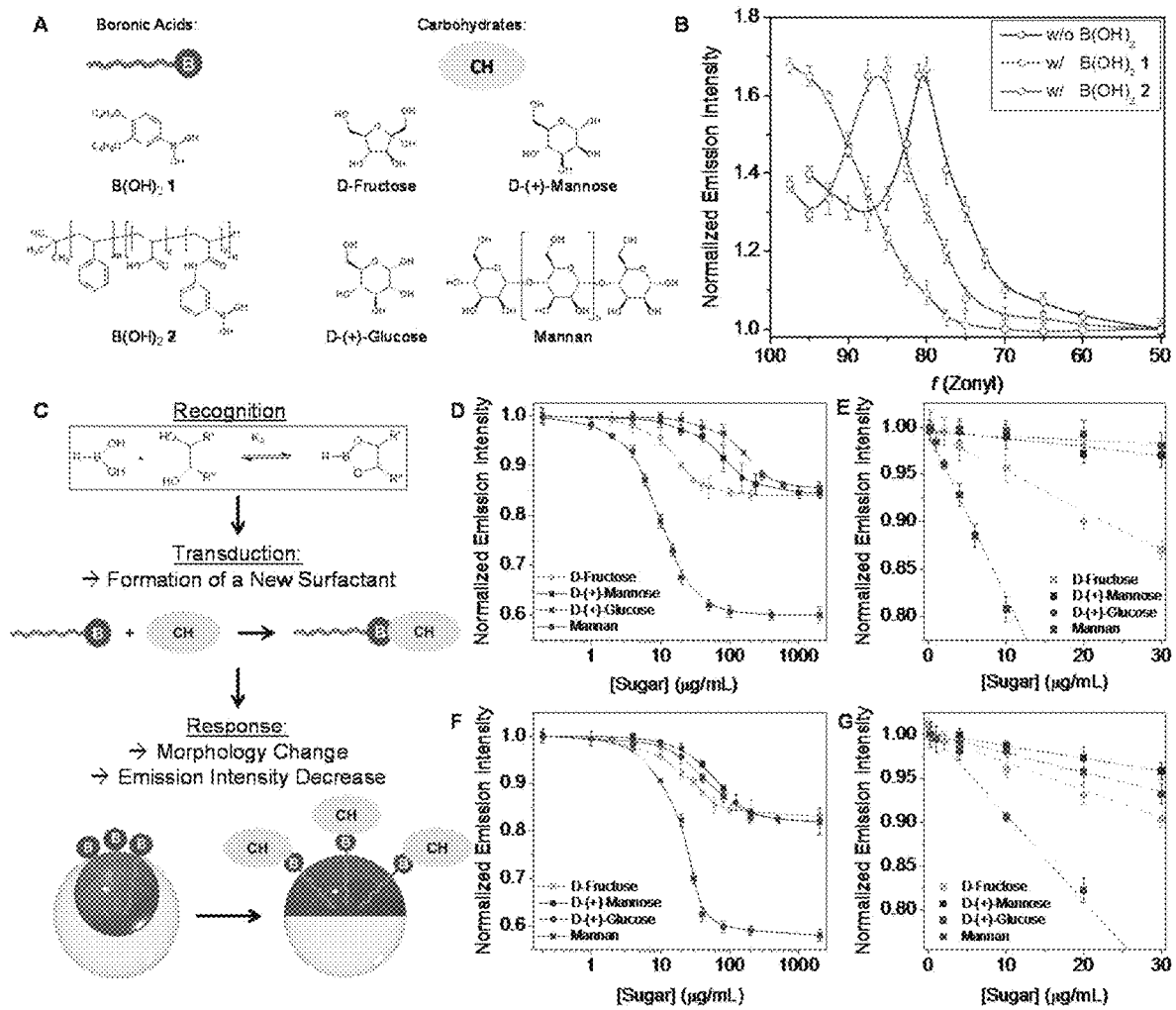

FIGS. 16A-16G show carbohydrate sensing using boronic acid functionalized complex emulsions, according to one set of embodiments. (FIG. 16A) Chemical structures of carbohydrates and boronic acid surfactants $B(OH)_2$ 1 and 2 used in this study; (FIG. 16B) Shift in the L-Curve upon addition of the boronic acid surfactants 1 and 2; (FIG. 16C) Boronic acid reversible reaction with 1,2-diols and schematic illustration of how this can be used to expand the HC/W interface; Emission intensity as a function of mono- and polysaccharide concentrations and standard deviations (N≥5) for droplets functionalized with $B(OH)_2$ 1 (d), and $B(OH)_2$ 2 (FIG. 16F); The slope of the linear decrease of the emission intensity at low sugar concentrations can be correlated to the effectiveness of the sugars for lowering the HC/W interfacial tension (FIG. 16E) and (FIG. 16G).

Figures 17A, 17B, 17C, 17D, 17E, 17F, 17G:
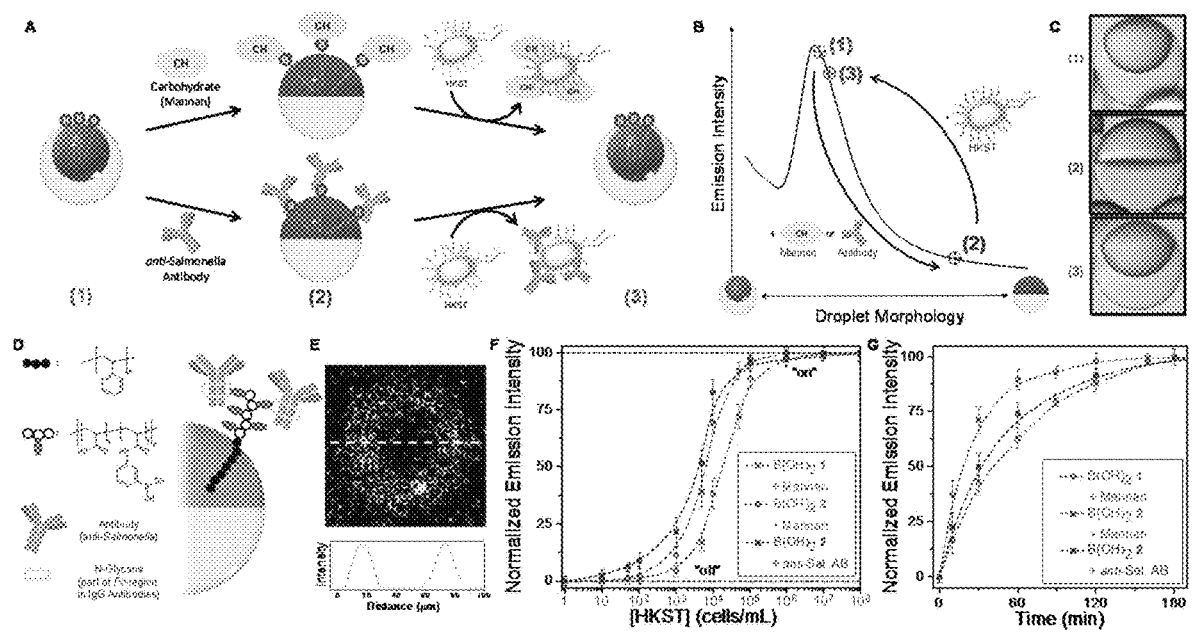

FIGS. 17A-17G show detection of *Salmonella enterica* cells using carbohydrate- or antibody-functionalized complex emulsions, according to one set of embodiments. (FIG. 17A) Schematic illustration of the droplet morphology change induced by reversible assembly of carbohydrates or IgG antibodies at the HC/W interface and upon removal of the carbohydrates or antibodies from the interface as a result of competitive binding to *Salmonella* cells; (FIG. 17B) L-Curve: Boronic acid-functionalized complex emulsion were adjusted to yield the highest emission intensity (1); upon reversible binding to carbohydrates the emission intensity decreases by up to 60% as a result of a Janus droplet morphology (2); and increases again back to the origin state upon removal of the carbohydrates by *Salmonella* cells (3); (FIG. 17C) Side-view images of droplets (d=100 µm) in the three morphology states characteristic for the L-Curve: (1) starting point: droplets containing 1.3 mg/mL $B(OH)_2$ 2 in 100% Zonyl surfactant solution (2) after addition of 30 µg/mL mannan, and (3) after addition of 105 cells/mL HKST; (FIG. 17D) Schematic illustration of the oriented attachment of IgG-antibodies (25 µg/mL) at the HC/W interface of complex emulsions; (FIG. 17E) Confocal microscope image of a droplet functionalized with a FITC-labeled IgG antibody; Measured emission intensity and standard deviations (N≥5) as a function of *Salmonella* cells (FIG. 17E), and time (detection of 105 HKST/mL) (FIG. 17G).

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Embodiments described herein may be useful for optofluidic devices. For example, optofluidic devices using dynamic fluid lens materials represent an ideal platform to create versatile, reconfigurable, refractive optical components. For example, the articles described herein may be useful as fluidic tunable compound micro-lenses. Such compound micro-lenses may be composed of two or more components (e.g., two or more inner phases) that form stable bi-phase (or multi-phase) emulsion droplets in outer phases (e.g., aqueous media). Advantageously, the refractive index contrast at each material interface and/or the curvature of each interface may contribute to the focusing power of a refractive optical element, allowing for a wide tuning range of the emulsion lenses' focal length, and thereby enabling switching between converging or diverging lens geometries. In some embodiments, the droplet-based lenses can be easily fabricated on a large scale using, for example, a temperature-induced phase separation technique. Advantageously, the radius of curvature between two or more components and/or the average focal length of transmitted or reflected light through the droplets may be controlled by exposing the plurality of droplets to a stimulus. In some embodiments, advantageously, the plurality of droplets may be configured such that light rays may modified (e.g., via stimulation of the droplets, exposure to an analyte such as a pathogen) to have a detectable emission intensity and/or angle of maximum emission intensity under a particular set of conditions.

the plurality of droplets have a second average radius of curvature between the first component and the second component that causes light rays to have a second emission intensity at the given emission direction, different than the first emission intensity, under a second set of conditions, different than the first set of conditions. The articles described herein may be useful, for example, in adaptive light field imaging, integral imaging, 3D displays, responsive illumination shaping, bio-sensing via optical transduction mechanisms (e.g., for label-free detection assays for proteins or small molecules), light harvesting in solar energy conversion systems (e.g., such as autonomous sun-position trackers that optimize light-intake on the absorption element that converts photons into electrons), alternatives to mechanical focusing of optical systems (e.g., microlenses with controllable focal lengths may reduce or eliminate the need for mechanically moving parts and/or reduce the size of optical systems while enabling high precision focusing), medical imaging (e.g., ophthalmology, endoscopy), optical sensing, advanced biocompatible photolithography, optical trapping, and laser optics. In some embodiments, the articles described herein may be particularly useful for, for example, sensing of analytes such as pathogens.

Articles comprising a plurality of droplets (e.g., colloids) as described herein offer numerous advantages to such articles known in the art, including the ability to reversibly, dynamically, and/or controllably change the focal length for transmitted or reflected light (e.g., in response to exposure to a stimulus). In some embodiments, the article comprises an outer phase and a plurality of droplets comprising two or more components. For example, in certain embodiments, the article comprises an outer phase and a plurality of droplets comprising a first component and a second component. Additional components (e.g., a third component, a fourth component) are also possible. Those skilled in the art will also be capable of selecting suitable materials and/or components for use in the embodiments described herein based on the teachings of the specification and examples below.

In some embodiments, the article may be stimulated (e.g., by a first stimulus such as a change in temperature or exposure to an analyte) such that the average radius of curvature between two components and/or the average focal length for transmitted or reflected light of at least a portion of the plurality of droplets change. Those skilled in the art would understand that changes in radius of curvature as described herein does not refer to the motion of immiscible components in a droplet due to regular fluid motion driven by passive diffusion and/or Brownian motion, but instead refer to the controlled change in the configuration of the components as a result of the addition of a particular stimulus or condition not present prior to the change in configuration of the components (or removal of a particular stimulus or condition, present prior to the change in configuration of the components), and are described in more detail below. In certain cases, a change in temperature may increase the passive diffusion and/or Brownian motion of components present in the droplet but does not result in a change in configuration (e.g., radius of curvature between two components) of the components as described herein (e.g., until exposed to a stimulus).

In some embodiments, the outer phase and at least one component are substantially immiscible. In certain embodiments, the outer phase and at least two components are substantially immiscible. Immiscible, as used herein, refers to two components (or a phase and a component) having an interfacial tension of greater than or equal to 0.01 mN/m as determined by an inverted pendant drop goniometer. Conversely, miscible, as used herein, refers to two components (or a phase and a component) having an interfacial tension of less than 0.01 mN/m as determined by an inverted pendant drop goniometer.

Figure 1A:
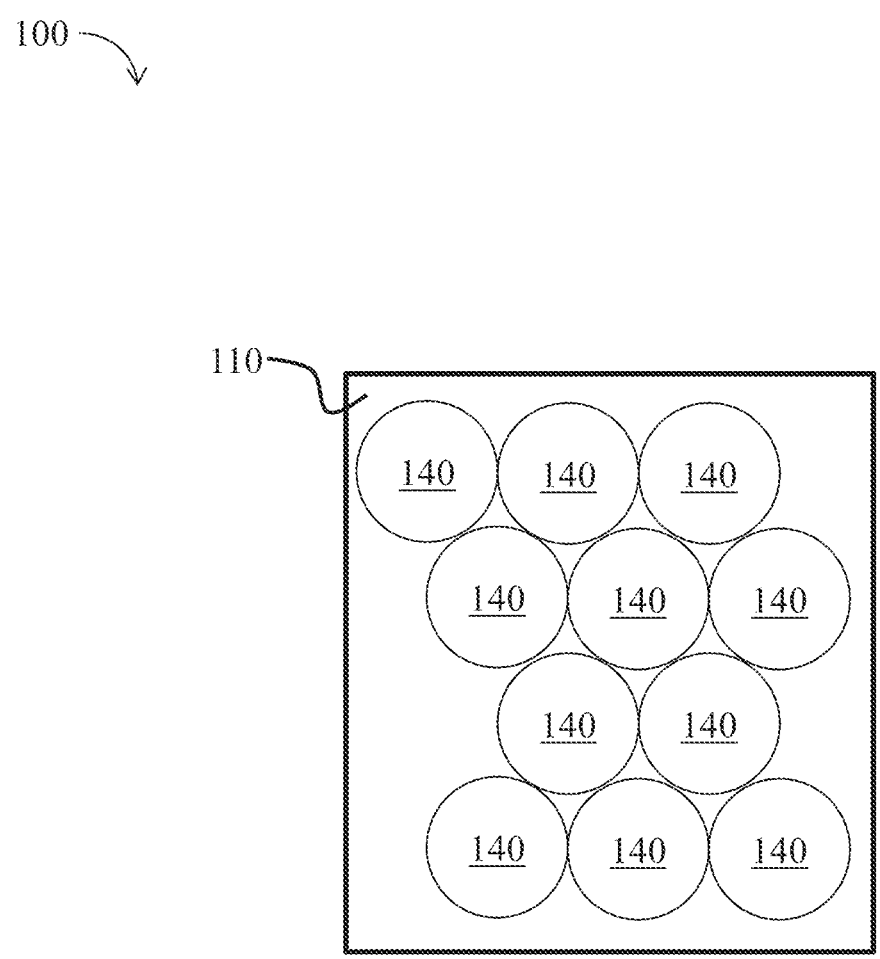
FIGS. 1A-D are schematic drawings illustrating an article comprising a plurality of droplets, according to one set of embodiments.
Figure 1B:
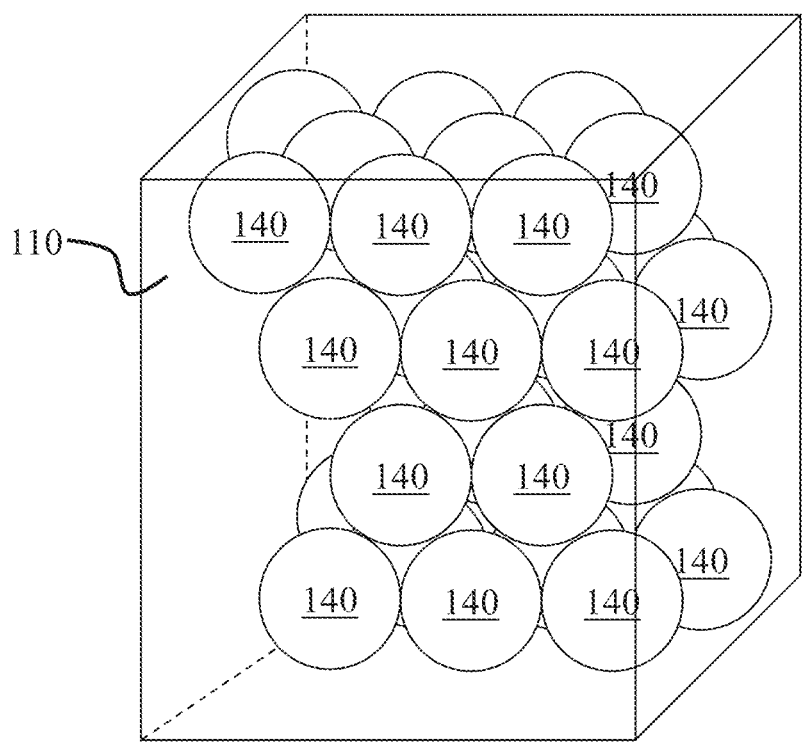

In certain embodiments, the article comprises an array of droplets (e.g., a plurality of droplets arranged in an array). For example, as illustrated in FIG. 1A, article 100 comprises an array of droplets (e.g., comprising a plurality of droplets 140) arranged in a two-dimensional configuration. In certain embodiments, the array of droplets may be dispersed within an outer phase 110. In some cases, as illustrated in FIG. 1B, article 102 comprises an array of droplets (e.g., comprising a plurality of droplets 140) arranged in a three-dimensional configuration.

Droplets described herein offer numerous advantages to droplets known in the art, including the ability to reversibly, dynamically, and/or controllably change the arrangement and/or configuration of the components within the droplets (e.g., in response to an external stimulus, a change in temperature, or an analyte). In some embodiments, the article comprises an outer phase and a plurality of droplets comprising two or more components. For example, in certain embodiments, the article comprises an outer phase and a plurality of droplets comprising a first component and a second component. In some cases, the article comprises an outer phase, and a plurality of droplets comprising a first component, a second component, and a third component. Additional components are also possible. In some embodiments, the plurality of droplets comprise an interface between at least the first component and the second component having a particular radius of curvature. Advantageously, changes in the radius of curvature of the interface(s) described herein may indicate the presence of a stimulus (e.g., an analyte, a pathogen) and/or may be used to reversibly change the focal length of transmitted light through the interface(s). Such articles may be useful for, for example, as tunable compound micro-lenses.

Figure 1C:
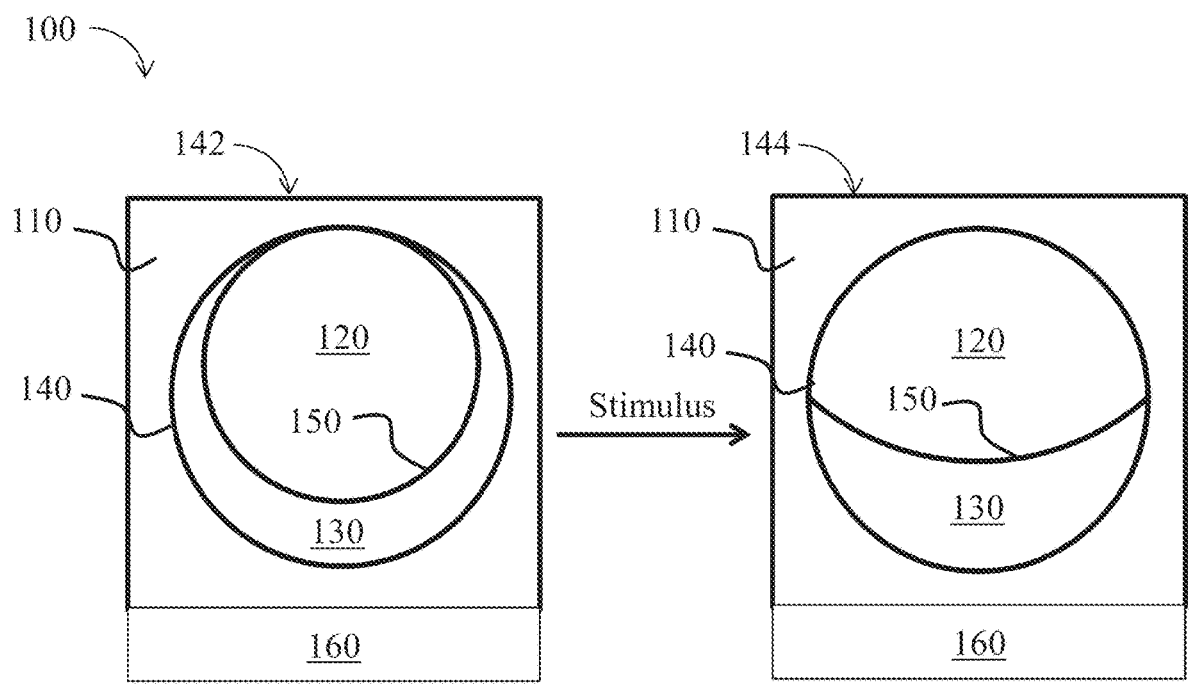

In some embodiments, each droplet 140 (e.g., at least a portion of the droplets in an array of droplets) comprises at least a first component (e.g., a first inner phase) and a second component (e.g., a second inner phase) immiscible with the first component. As illustrated in FIG. 1C, article 100 comprises a droplet 140 (an exemplary droplet within a plurality of droplets) comprising a first component 120 and a second component 130 immiscible with first component 120 and in contact with first component 120 at interface 150. In certain embodiments, the plurality of droplets (e.g., a plurality of droplets 140) are dispersed within an outer phase 110.

In some embodiments, the first component is present in each droplet in an amount greater than or equal to 10 vol %, greater than or equal to 15 vol %, greater than or equal to 20 vol %, greater than or equal to 25 vol %, greater than or equal to 30 vol %, greater than or equal to 35 vol %, greater than or equal to 40 vol %, greater than or equal to 45 vol %, greater than or equal to 50 vol %, greater than or equal to 55 vol %, greater than or equal to 60 vol %, greater than or equal to 65 vol %, greater than or equal to 70 vol %, greater than or equal to 75 vol %, greater than or equal to 80 vol %, or greater than or equal to 85 vol % on average versus the total volume of all components within each droplet. In certain embodiments, the first component is present in each droplet in an amount less than or equal to 90 vol %, less than or equal to 85 vol %, less than or equal to 80 vol %, less than or equal to 75 vol %, less than or equal to 70 vol %, less than or equal to 65 vol %, less than or equal to 60 vol %, less than or equal to 55 vol %, less than or equal to 50 vol %, less than or equal to 45 vol %, less than or equal to 40 vol %, less than or equal to 35 vol %, less than or equal to 30 vol %, less than or equal to 25 vol %, less than or equal to 20 vol %, or less than or equal to 15 vol % on average versus the total volume of all components within each droplet. Combinations of the above-referenced ranges are also possible (e.g., greater than or equal to 10 vol % and less than or equal to 90 vol %, greater than or equal to 35 vol % and less than or equal to 65 vol %, greater than or equal to 45 vol % and less than or equal to 55 vol %). Other ranges are also possible.

In certain embodiments, the second component is present in each droplet in an amount greater than or equal to 10 vol %, greater than or equal to 15 vol %, greater than or equal to 20 vol %, greater than or equal to 25 vol %, greater than or equal to 30 vol %, greater than or equal to 35 vol %, greater than or equal to 40 vol %, greater than or equal to 45 vol %, greater than or equal to 50 vol %, greater than or equal to 55 vol %, greater than or equal to 60 vol %, greater than or equal to 65 vol %, greater than or equal to 70 vol %, greater than or equal to 75 vol %, greater than or equal to 80 vol %, or greater than or equal to 85 vol % on average versus the total volume of all components within each droplet. In some embodiments, the second component is present in each droplet in an amount less than or equal to 90 vol %, less than or equal to 85 vol %, less than or equal to 80 vol %, less than or equal to 75 vol %, less than or equal to 70 vol %, less than or equal to 65 vol %, less than or equal to 60 vol %, less than or equal to 55 vol %, less than or equal to 50 vol %, less than or equal to 45 vol %, less than or equal to 40 vol %, less than or equal to 35 vol %, less than or equal to 30 vol %, less than or equal to 25 vol %, less than or equal to 20 vol %, or less than or equal to 15 vol % on average versus the total volume of all components within each droplet. Combinations of the above-referenced ranges are also possible (e.g., greater than or equal to 10 vol % and less than or equal to 90 vol %, greater than or equal to 35 vol % and less than or equal to 65 vol %, greater than or equal to 45 vol % and less than or equal to 55 vol %). Other ranges are also possible.

In an exemplary set of embodiments, the plurality of droplets comprise the first component in an amount of greater than or equal to 35 vol % and less than or equal to 65 vol % and the second component in the remaining amount versus the total volume of the first and second components in the droplets.

As described above and herein, the plurality of droplets may be arranged in a two-dimensional or three-dimensional array. The phrase "two-dimensional array" is given its ordinary meaning in the art and generally refers to the ordered arrangement of objects (e.g., droplets) in e.g., ordered rows and columns in a two-dimensional plane comprising said objects. The phrase "three-dimensional array" is given its ordinary meaning in the art and generally refers to the ordered arrangement of objects (e.g., droplets) in e.g., ordered rows, columns, and slices (or planes) in a three-dimensional space. In some embodiments, the plurality of droplets may be in a disordered or partially disordered array (e.g., randomly oriented).

Any terms as used herein related to shape, orientation, alignment, and/or geometric relationship of or between, for example, one or more droplets, components, combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, alignment, and/or geometric relationship include, but are not limited to terms descriptive of: shape—such as, round, square, circular/circle, rectangular/rectangle, triangular/triangle, cylindrical/cylinder, elipitical/elipse, (n)polygonal/(n)polygon, U-shaped, line-shaped, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; arrangement—array, row, column, etc. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, a plurality of droplets that would be described herein as being in an "array" would not require such droplets to have centers that are perfectly arranged in row and columns in which all major axes of the droplets are aligned (indeed, such an array can only exist as a mathematical abstraction), but rather, the arrangement of such droplets should be interpreted as approximating an "array", as defined mathematically, to an extent typically achievable and achieved for the recited fabrication technique as would be understood by those skilled in the art or as specifically described.

In some embodiments, at least 10% of the plurality of droplets in the article are in physical contact with each other. For example, at least 10%, at least 20%, at least 30%, at least 40%, at least 50%, at least 60%, at least 70%, at least 80%, or at least 90% of the droplets in the article are in contact with at least one other droplet. In some embodiments, less than or equal to 100%, less than or equal to 90%, less than or equal to 80%, less than or equal to 70%, less than or equal to 60%, less than or equal to 50%, less than or equal to 40%, less than or equal to 30%, or less than or equal to 20% of the droplets in the article are in contact with at least one other droplet. Combinations of the above-referenced ranges are also possible (e.g., at least 10% and less than or equal to 100%). Other ranges are also possible.

In some embodiments, at least 10%, at least 20%, at least 30%, at least 40%, at least 50%, at least 60%, at least 70%, at least 80%, or at least 90% of the droplets in the article are arranged in a regular two-dimensional array. In some embodiments, less than or equal to 100%, less than or equal to 90%, less than or equal to 80%, less than or equal to 70%, less than or equal to 60%, less than or equal to 50%, less than or equal to 40%, less than or equal to 30%, or less than or equal to 20% of the droplets in the article are arranged in a regular two-dimensional array. Combinations of the above-referenced ranges are also possible (e.g., at least 10% and less than or equal to 100%). Other ranges are also possible.

In certain embodiments, at least 10%, at least 20%, at least 30%, at least 40%, at least 50%, at least 60%, at least 70%, at least 80%, or at least 90% of the droplets in the article are arranged in a regular three-dimensional array. In some embodiments, less than or equal to 100%, less than or equal to 90%, less than or equal to 80%, less than or equal to 70%, less than or equal to 60%, less than or equal to 50%, less than or equal to 40%, less than or equal to 30%, or less than or equal to 20% of the droplets in the article are arranged in a regular three-dimensional array. Combinations of the above-referenced ranges are also possible (e.g., at least 10% and less than or equal to 100%). Other ranges are also possible.

The plurality of droplets may have a first configuration (e.g., arrangement of two or more phases within each droplet, radius of curvature between two or more phases within each droplet) under a first set of conditions. For example, in the first configuration, the interface between a first phase and a second phase may have a first radius of curvature. In certain embodiments, at least a portion of the plurality of droplets has a second configuration, different than the first configuration, under a second set of conditions different than the first set of conditions. In some embodiments, in the second configuration, the interface between the first phase and the second phase may have a second radius of curvature, different than the first radius of curvature.

In some embodiments, the article comprising an outer phase and a plurality of droplets is adjacent a substrate.

For example, referring again to FIG. 1C, substrate 160 may be adjacent (e.g., directly adjacent) outer phase 142. The substrate may comprise any suitable material including, but not limited to, metals, polymers, ceramics, glass, biological tissue, amongst others. Those of ordinary skill in the art would be capable of selecting suitable substrates for forming articles described herein based upon the teachings of the specification. In some cases, the substrate may be transparent. In other embodiments, the substrate may be selected to be at least partially opaque. In some cases, the substrate may comprise one or more images (e.g., designs, graphics, text, QR code, barcodes, or the like) and/or features (e.g., posts, ridges, holes, embossed features, debossed features, or the like) present on at least a portion of a surface of the substrate. In some cases, the images and/or features may be visible through the article adjacent the substrate, under a first set of conditions. In certain embodiments, the images and/or features may change in color (e.g., wavelength), focus, magnification, visibility, intensity, and/or orientation (e.g., inverted) when viewed through the article adjacent the substrate, under a second set of conditions, different than the first set of conditions. In an exemplary set of embodiments, the images and/or features present on a surface of a substrate may be magnified when viewed through the article adjacent the substrate under a second set of conditions, as compared to the images and/or features under a first set of conditions different than the second set of conditions.

As used herein, when an article is referred to as being "adjacent" a substrate, it can be directly adjacent to the substrate, or one or more intervening components (e.g., layers including, but not limited to, a polymer layer, a glass layer, a coating, and/or a fluid) also may be present. An article that is "directly adjacent" a substrate means that no intervening component is present.

The first set of conditions may include the temperature, pressure, pH, an electric field, a magnetic field, and/or presence or absence of a particular stimulus such that the second set of conditions includes at least a temperature, pressure, pH, an electric field, a magnetic field, and/or presence or absence of a particular stimulus that is different than the first set of conditions. In some embodiments, the second set of conditions has a different temperature than the first set of conditions (e.g., other conditions such as pressure, pH, an electric field, a magnetic field, etc. may or may not be substantially similar). In certain embodiments, the second set of conditions comprises a stimulus that was not present, or was present in a substantially lesser amount, than in the first set of conditions. For example, in some embodiments, the plurality of droplets may have a first configuration and, upon exposure to a stimulus, at least a portion of the droplets obtain a second configuration different than the first configuration.

For example, referring again to FIG. 1C, article 100 may comprise a droplet 140 (or a plurality of droplets 140) having a first configuration 142. Upon exposure to a stimulus, droplet 140 may obtain a second configuration 144, different than first configuration 142. In some embodiments, droplet 140 comprises an interface 150 between first component 120 and second component 130. In certain embodiments, interface 150 may have a particular radius of curvature (e.g., a first radius of curvature under first configuration 142). In some cases, the radius of curvature of interface 150 may change (e.g., a second radius of curvature, different than the first radius of curvature, under second configuration 144). For example, upon exposure to a stimulus, the second configuration may have a radius of curvature between two phases and/or an average focal length for transmitted or reflected light that is different than the radius of curvature between two phases and/or the average focal length for transmitted or reflected light in the first configuration. Radius of curvature between two phases and average focal lengths are described in more detail, herein.

Figure 1D:
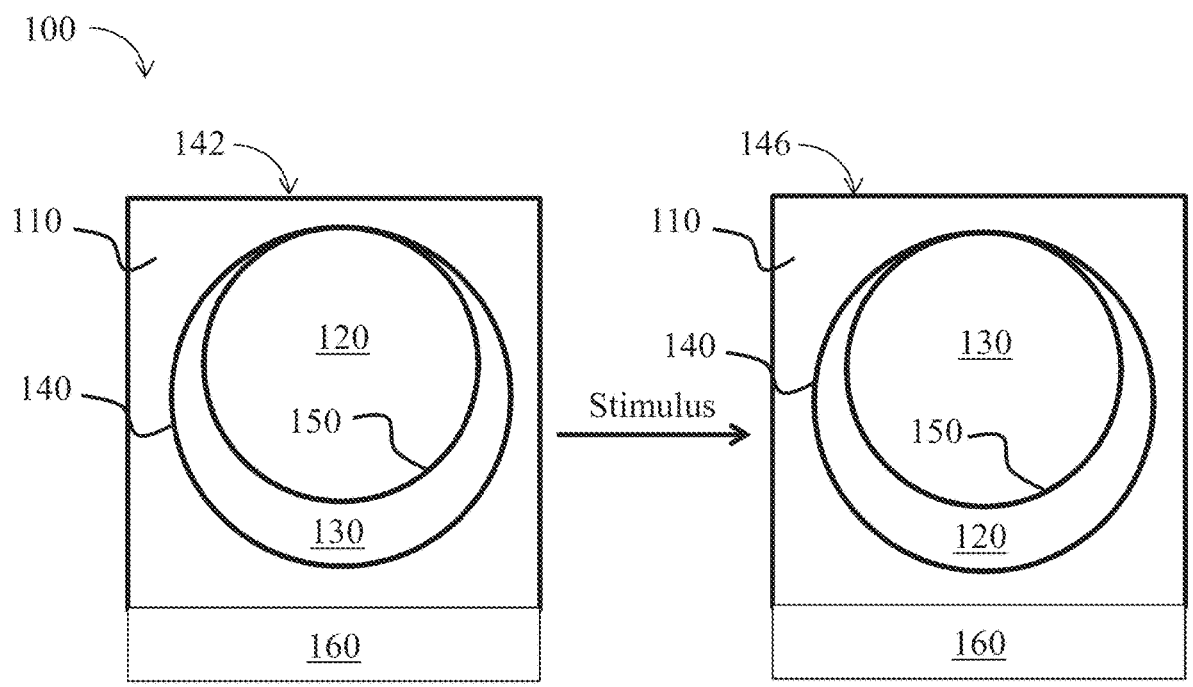

In some embodiments, exposing the article to a stimulus may cause two or more components to transpose. Referring to FIG. 1D, in some embodiments, article 100 comprises an outer phase 110, and a plurality of droplets (shown as exemplary droplet 140) comprising a first component 120 and a second component 130 at least partially encapsulated by the first component (configuration 142). In certain embodiments, article 100 having configuration 100A may be stimulated (e.g., by a first stimulus) such that at least a portion of the plurality of droplets obtain a second configuration 146, such that second component 130 at least partially encapsulates first component 120. That is to say, in certain embodiments, the first component and the second component may transpose. In some embodiments, the rearrangement between the first configuration and the second configuration may be reversible. For example, in some cases, article 100 comprising a plurality of droplets having second configuration 146 may be stimulated (e.g., by a second stimulus) such that at least a portion of the plurality of droplets return to first configuration 142. In certain embodiments, the radius of curvature between the two components may be substantially similar before and after exposure to the stimulus, but the average focal length for transmitted or reflected light may be different before and after exposure to the stimulus.

In some cases, the radius of curvature of the interface (e.g., in the first configuration) may be positive. For example, referring again to FIG. 1C, in some embodiments, the outer phase may be arranged (e.g., disposed on, in direct contact with) on a substrate 160. In some cases, the radius of curvature of the interface (e.g., interface 150) is such that light transmitted through the droplet converges at the interface. In certain embodiments, the radius of curvature of the interface is such that light transmitted through the droplet diverges at the interface. For example, in some cases, the radius of curvature of interface 150 (e.g., in a first configuration) may be greater than κ. In certain embodiments, the radius of curvature of interface 150 (e.g., in a first configuration) may be less than 0. In some embodiments, the radius of curvature of interface 150 may be 0 (e.g., in some cases, interface 150 may be parallel to a major plane of the surface of the substrate). Those of ordinary skill in the art would understand how to determine the radius of curvature of the interface based on the teachings of this specification.

In some embodiments, the magnitude of the radius of curvature of the interface may increase upon exposure of the droplets to a stimulus. For example, the magnitude of the radius of curvature of the interface in the second configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the radius of curvature of the interface in the first configuration. In some embodiments, the magnitude of the radius of curvature of the interface in the second configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the radius of curvature of the interface in the first configuration. Combinations of the above-referenced ranges are possible (e.g., greater than or equal to 1.1 and less than or equal to 1000000 times greater). Other ranges are also possible.

In some embodiments, the magnitude of the radius of curvature of the interface may decrease upon exposure of the droplets to a stimulus. For example, the magnitude of the radius of curvature of the interface in the first configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the radius of curvature of the interface in the second configuration. In some embodiments, the magnitude of the radius of curvature of the interface in the first configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the radius of curvature of the interface in the second configuration. Combinations of the above-referenced ranges are possible (e.g., greater than or equal to 1.1 and less than or equal to 1000000 times greater). Other ranges are also possible.

In certain embodiments, the radius of curvature of the interface may be greater than 0 in the first configuration and less than 0 in the second configuration. In some embodiments, the radius of curvature of the interface may be less than 0 in the first configuration and greater than 0 in the second configuration. In some cases, the radius of curvature of the interface may be less than 0 in the first configuration and less than 0 in the second configuration, but different in magnitude than the first configuration. In some embodiments, the radius of curvature of the interface may be greater than 0 in the first configuration and greater than 0 in the second configuration, but different in magnitude than the first configuration. In some cases, the magnitude of the radius of curvature of the interface may be substantially the same in the first configuration and the second configuration. In some such embodiments, the relative positions of the first component and the second component relative to one another may transpose. For example, as illustrated schematically in FIG. 1D, the radius of curvature of interface 150 is substantially the same in first configuration 142 and second configuration 146, while first component 120 and second component 130 have transposed between the first and second configurations. In other embodiments, the radius of curvature of interface 150 may be different in the first and second configurations.

Non-limiting examples of stimuli include a change in electromagnetic radiation (e.g., light), ionizing radiation, a magnetic field, an electric field, a mechanical force, adjusting the ionic strength of the outer phase, adjusting the temperature of the outer phase, exposing the plurality of droplets to photochemical stimulation, adding an analyte to the outer phase (e.g., presence or absence of an analyte), applying an electric or magnetic field, or combinations thereof.

Figure 1E:
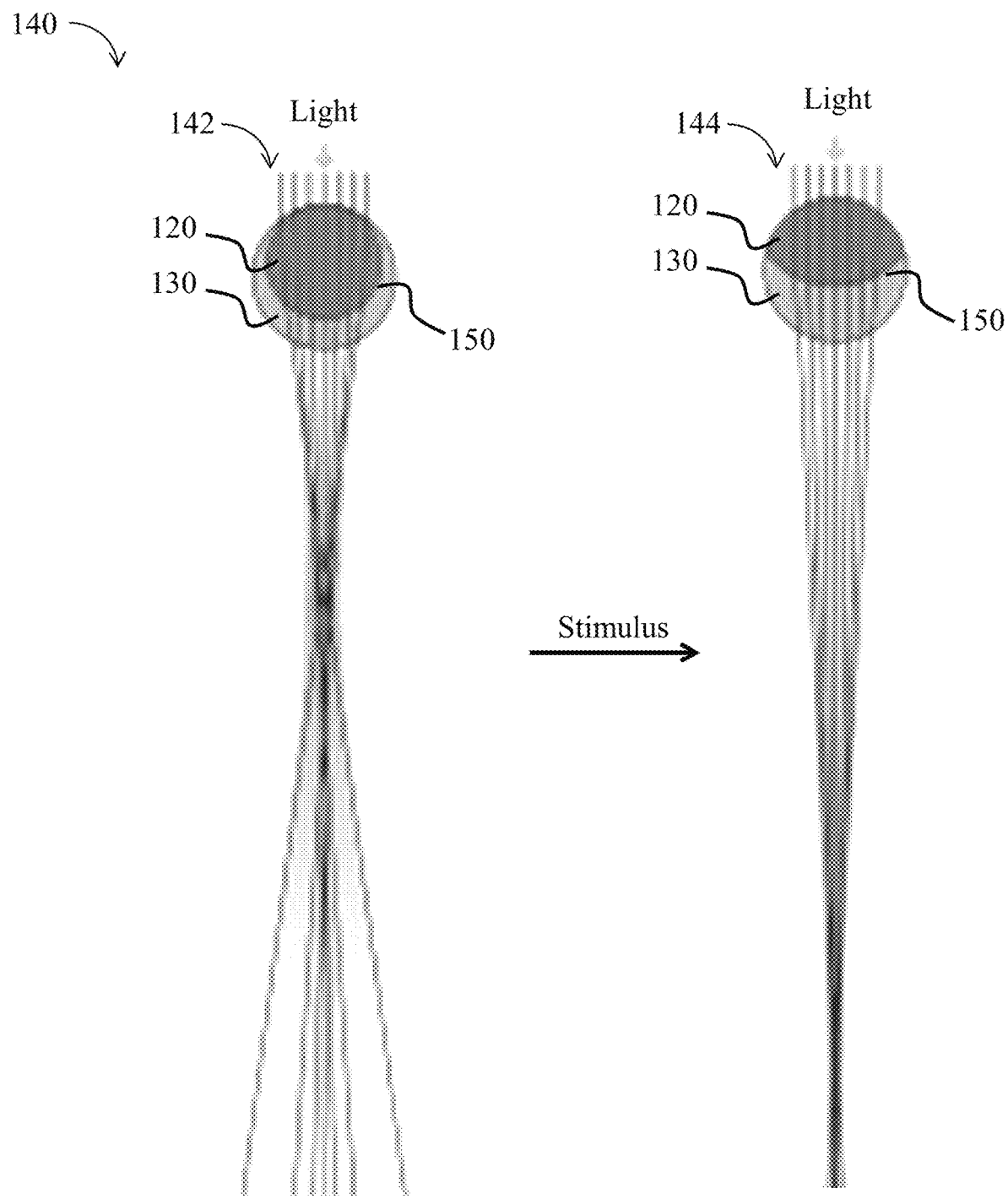
FIGS. 1E-1F are schematic drawings illustrating the focal length of transmitted light through exemplary droplet configurations, according to one set of embodiments.
Figure 1F:
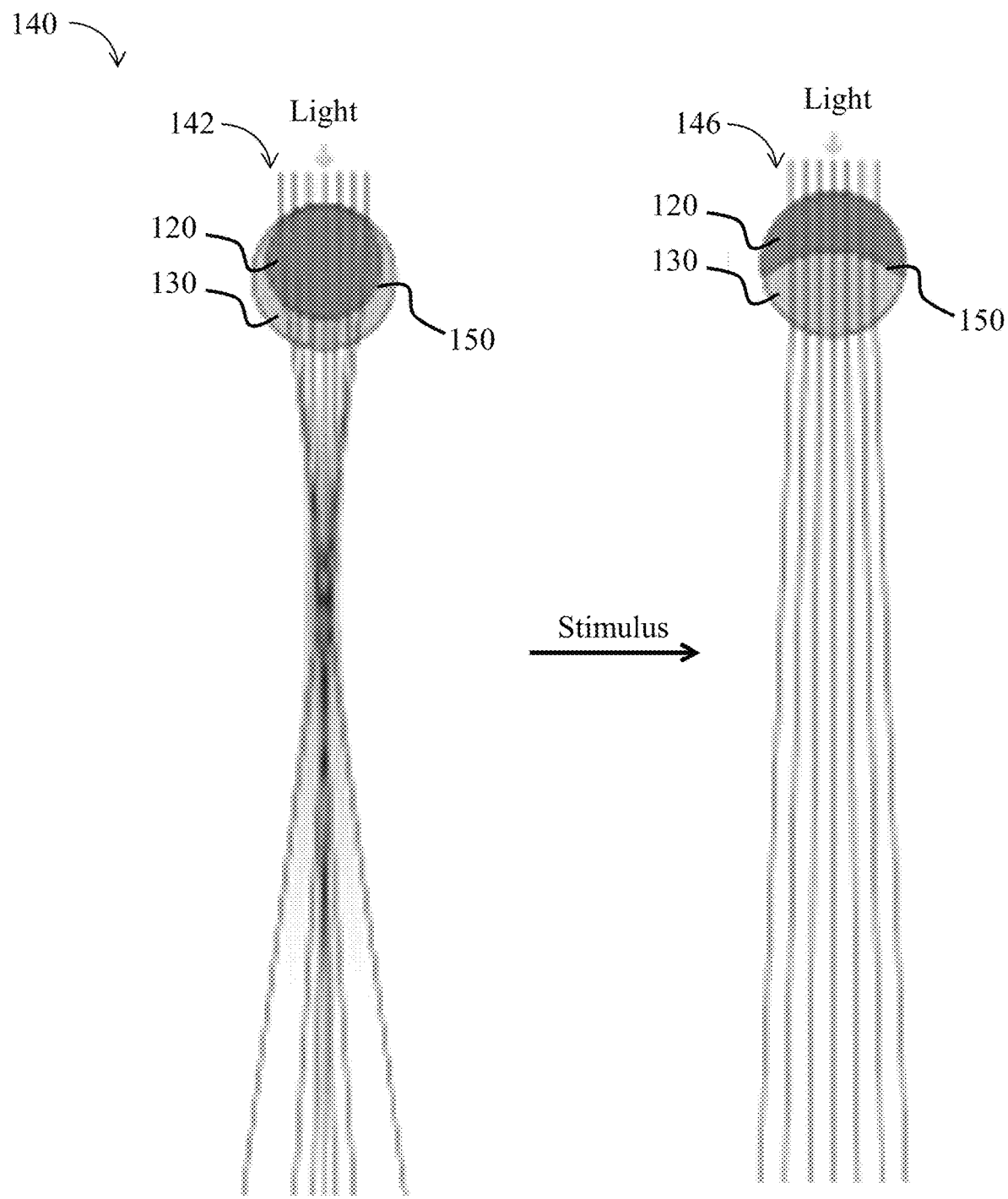

In some embodiments, the average focal length for transmitted or reflected light of at least a portion of the droplets in the article may change upon exposure to a stimulus. For example, as illustrated in FIG. 1E, an article comprising exemplary droplet 140 may have a first configuration 142, such that the first configuration has a first average focal length for transmitted or reflected light. For example, the radius of curvature of interface 150 may be such that transmitted light interacts with the interface, causing the transmitted light to exhibit a particular average focal length. In some embodiments, upon exposure to a stimulus, droplet 140 may obtain a second configuration 144 (e.g., such that the radius of curvature between first component 120 and second component 130 at interface 150 in the second configuration is different than the radius of curvature between first component 120 and second component 130 at interface 150 in the first configuration). The second configuration 144 may have a second average focal length for transmitted or reflected light, different than the average focal length for transmitted or reflected light of first configuration 142. In certain embodiments, transmitted or reflected light exposed to the droplet focuses (e.g., as shown in first configuration 142 in FIG. 1E). In some embodiments, the transmitted or reflected light exposed to the droplet may diverge. For example, as shown illustratively in FIG. 1F, upon exposure to a stimulus, droplet 140 may obtain a second configuration 146 such that transmitted or reflected light exposed to the droplet diverges. For example, the radius of curvature of interface 150 in configuration 142 may be such that the transmitted or reflected light exposed to the droplet has a particular focal length and, upon stimulation of droplet 140 such that it obtains second configuration 146, the radius of curvature of interface 150 in configuration 146 is such that the transmitted or reflected light diverges.

In certain embodiments, the plurality of droplets have a first average focal length for transmitted or reflected light under a first set of conditions, and the plurality of droplets have a second average focal length for transmitted or reflected light different than the first average focal length under a second set of conditions, different than the first set of conditions. In some cases, the plurality of droplets may have a first average radius of curvature between the first component and the second component (e.g., at the interface between the first component and the second component) under the first set of conditions (e.g., that causes light rays to focus), and the plurality of droplets have a second average radius of curvature between the first component and the second component under a second set of conditions, different than the first set of conditions. In some cases, the average focal length for transmitted or reflected light may change as the radius of curvature at the interface between the first component and the second component changes.

In some embodiments, at least a first portion of the plurality of droplets in an array may have a first average focal length for transmitted or reflected light. In certain embodiments, at least a second portion of the plurality of droplets in the array may have a second average focal length for transmitted or reflect light, different than the first average focal length. In some embodiments, the first portion of the plurality of droplets may be stimulated (e.g., exposed to an analyte) such that the first average focal length changes (e.g., increases, decreases). In some embodiments, at least a first portion of the plurality of droplets has a first radius of curvature between the first component and the second component (e.g., that causes light rays to focus), and at least a second portion of the plurality of droplets has a second radius of curvature between the first component and the second component, different than the first radius of curvature. In some cases, the first portion of the plurality of droplets may be stimulated (e.g., exposed to an analyte) such that the first radius of curvature changes (e.g., increases, decreases).

While the embodiments and figures described herein show a first configuration (e.g., first configuration 142) such that transmitted or reflected light focuses, those of ordinary skill in the art would understand based upon the teachings of this specification that the transmitted or reflected light may diverge in the first configuration. For example, in some cases, the first configuration may be such that transmitted light diverges and the second configuration may be such that transmitted light focuses. In certain embodiments, the first configuration may be such that transmitted light diverges and the second configuration may be such that transmitted light diverges in a different amount (e.g., such that the average focal length is different in the second configuration than in the first configuration). Other configurations such that transmitted or reflected light focuses or diverges may be possible. In some cases, the average focal length in the first and second configurations may be different. In certain embodiments, the amount of divergent transmitted light between the first and second configurations may be different.

In certain embodiments, as described herein, the plurality of droplets may be exposed to a source of electromagnetic radiation (e.g., visible light), such that at least a portion of the electromagnetic radiation (e.g., a particular wavelength or range of wavelengths) is at least partially transmitted (e.g., such that at least some electromagnetic radiation passes through the droplet) through the droplet. In some cases, at least a portion of the electromagnetic radiation may be reflected off of at least a surface (e.g., a surface of the first component, a surface of the second component, a surface of the interface between the first component and the second component) of the droplet. The electromagnetic radiation (e.g., light) may comprise any suitable wavelength, including but not limited to radio waves (e.g., a wavelength between about 1 cm and about 100 m), infrared light (e.g., a wavelength between about 700 nm and about 1 cm), visible light (e.g., a wavelength between about 400 nm and about 700 nm), ultraviolet (UV) light (e.g., a wavelength between about 10 nm and about 400 nm), x-rays (e.g., a wavelength between about 0.01 nm and about 10 nm), and combinations thereof.

As described herein, the electromagnetic radiation transmitted through and/or reflected by the droplet may be detected (e.g., visibly by a user, by a sensor, etc.). In certain embodiments, a change in electromagnetic radiation (e.g., focal length through the droplet, intensity, frequency, and/or range) may be detected upon stimulation of the droplet (e.g., such that at least a portion of the plurality of droplets in an array change configuration upon exposure to a stimulus). In some cases, the detection of a change in the transmitted (or reflected) electromagnetic radiation may indicate the presence of stimulus (e.g., the presence of an analyte e.g., that interacts with the plurality of droplets).

Figure 1G:
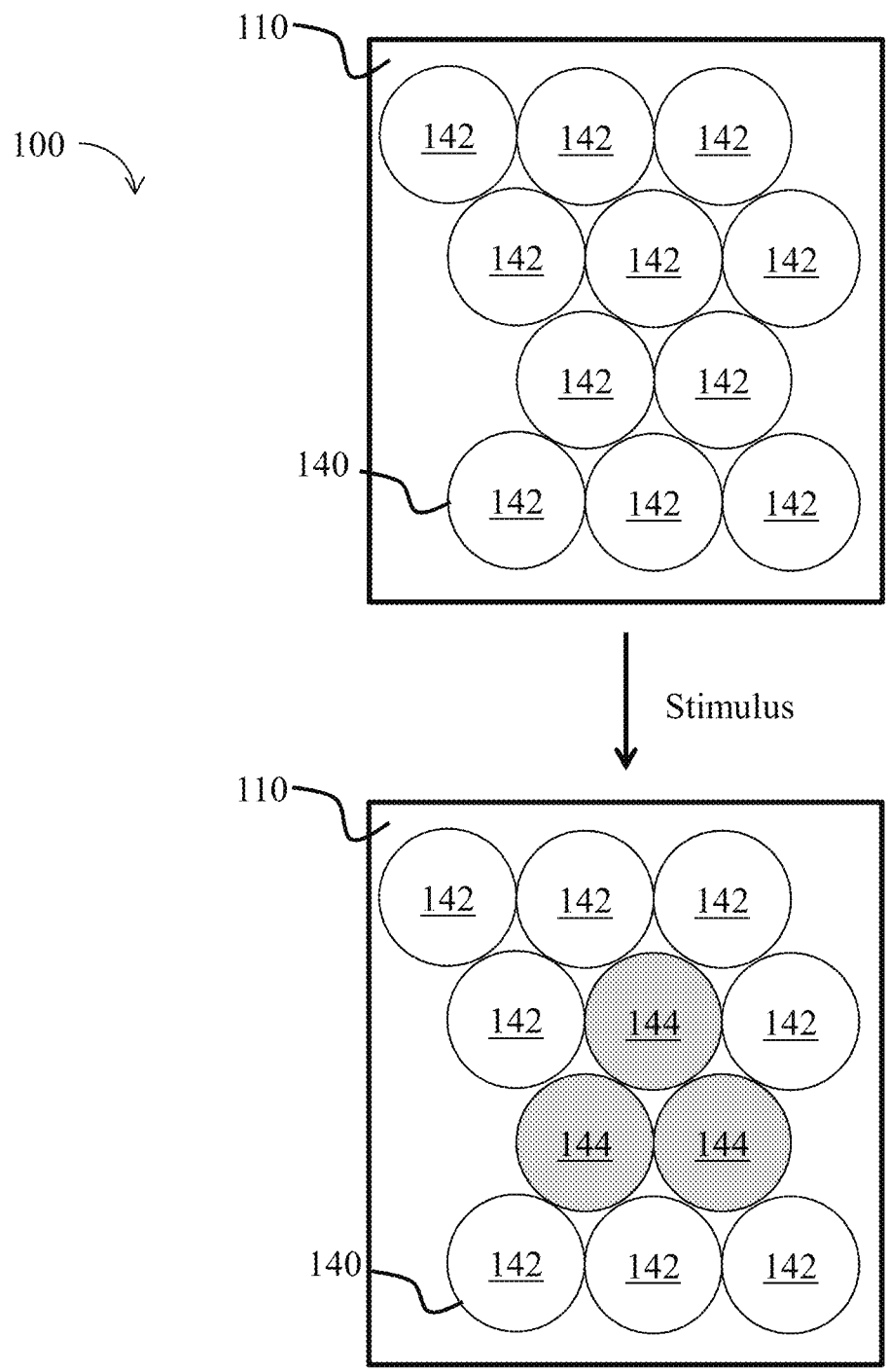
FIGS. 1G-1H are schematic drawings illustrating an article comprising a plurality of droplets, according to one set of embodiments.
Figure 1H:
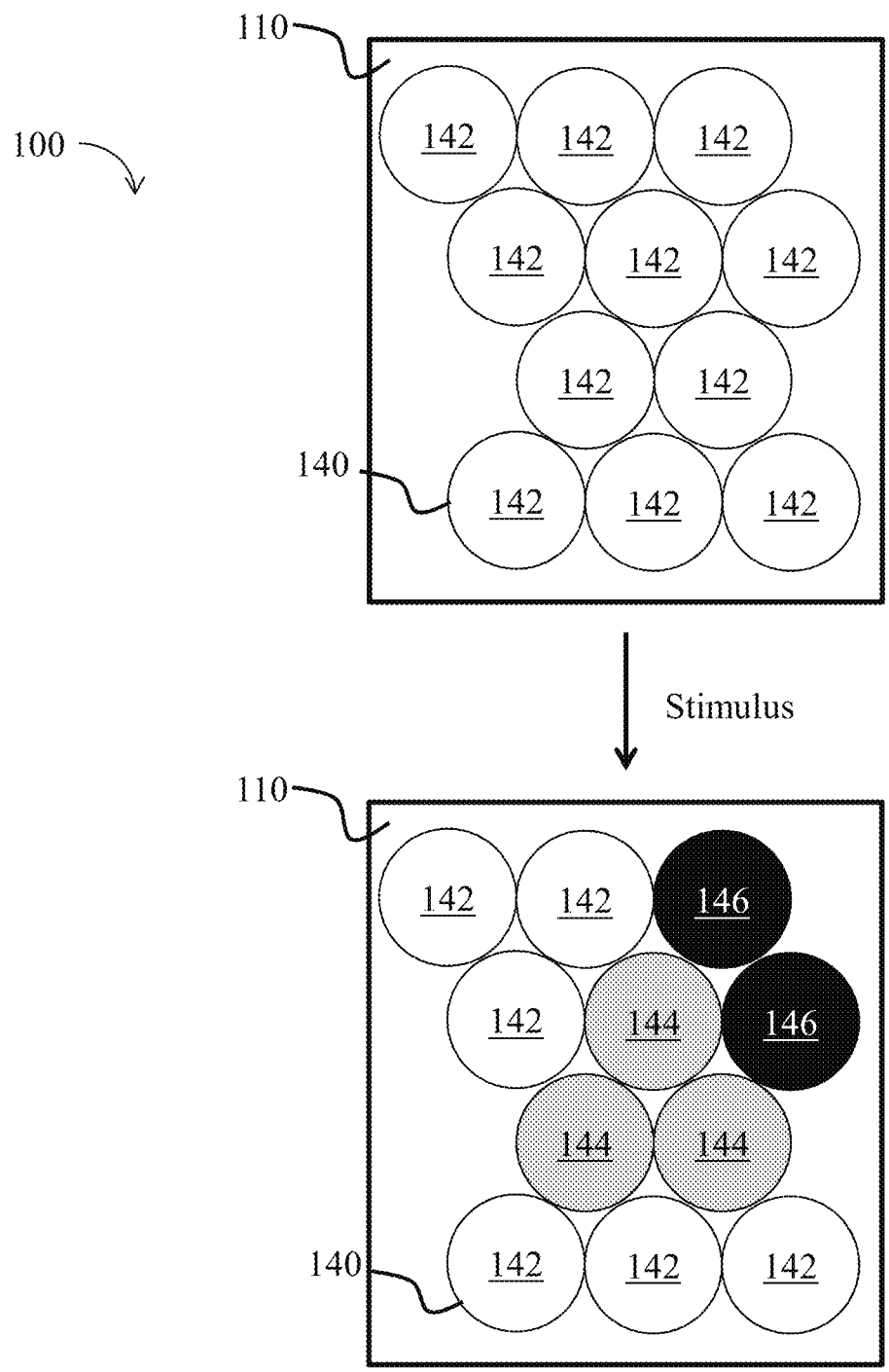

In some embodiments, as described herein, at least a portion of the plurality of droplets in an array change configuration upon exposure to a stimulus (e.g., a stimulus added to the outer phase of the article). For example, as shown illustratively in FIG. 1G, article 100 comprises an array of droplets 140 dispersed in an outer phase 110, each droplet having a first configuration 142. In certain embodiments, upon exposure to a stimulus, at least a portion of the droplets in the array change configuration to obtain second configuration 144. In some embodiments, upon exposure to a stimulus, at least a first portion of the droplets in the array obtain a second configuration 144 and at least a second portion of the droplets in the array obtain a third configuration 146. For example, as illustrated in FIG. 1H, upon exposure to a stimulus, at least a portion of droplets 140 in the array have first configuration 142, a second portion of the droplets have second configuration 144, and a third portion of the droplets have third configuration 146. In some embodiments, a plurality of configurations upon exposure to a stimulus are also possible. For example, in certain embodiments, an article comprising an array of a plurality of droplets may, upon exposure to a stimulus, have a gradient of configurations.

As described herein, the article may comprise, in some cases, a plurality of droplets having a particular average focal length. In some embodiments, one or more components (e.g., the first component, the second component) are configured to be transparent to at least one wavelength of electromagnetic radiation (e.g., x-rays, ultraviolet, visible, IR, etc.). For example, in some embodiments, the first component is transparent to visible light such that, upon exposure of the droplet to the visible light, the visible light interacts with the interface between the first component and the second component and changes the average focal length and/or of the visible light.

In certain embodiments, the plurality of droplets comprises two or more components, each having a particular refractive index. For example, in some embodiments, the refractive index of the first component may be different than the refractive index of the second component. In some embodiments, the refractive index of the first component may be greater than the refractive index of the second component. In certain embodiments, the refractive index of the first component may be less than the refractive index of the second component. Suitable materials for the components of the droplets are described in more detail below. Those of ordinary skill in the art would be capable of selecting components with suitable refractive indices based upon the teachings of this specification.

In some embodiments, the refractive index of the first component may be greater than or equal to 1.2, greater than or equal to 1.25, greater than or equal to 1.3, greater than or equal to 1.35, greater than or equal to 1.4, greater than or equal to 1.45, greater than or equal to 1.5, or greater than or equal to 1.55. In certain embodiments, the refractive index of the first component may be less than or equal to 1.6, less than or equal to 1.55, less than or equal to 1.5, less than or equal to 1.45, less than or equal to 1.4, less than or equal to 1.35, less than or equal to 1.3, or less than or equal to 1.25. Combinations of the above referenced ranges are also possible (e.g., greater than or equal to 1.2 and less than or equal to 1.6, greater than or equal to 1.25 and less than or equal to 1.4, greater than or equal to 1.2 and less than or equal to 1.3). Other ranges are also possible.

In some embodiments, the refractive index (measured at 20° C.) of the second component may be greater than or equal to 1.2, greater than or equal to 1.25, greater than or equal to 1.3, greater than or equal to 1.35, greater than or equal to 1.4, greater than or equal to 1.45, greater than or equal to 1.5, or greater than or equal to 1.55. In certain embodiments, the refractive index (measured at 20° C.) of the second component may be less than or equal to 1.6, less than or equal to 1.55, less than or equal to 1.5, less than or equal to 1.45, less than or equal to 1.4, less than or equal to 1.35, less than or equal to 1.3, or less than or equal to 1.25. Combinations of the above referenced ranges are also possible (e.g., greater than or equal to 1.2 and less than or equal to 1.6, greater than or equal to 1.25 and less than or equal to 1.4, greater than or equal to 1.3 and less than or equal to 1.4). Other ranges are also possible. Refractive index, as used herein, refers to the refractive index of the component measured at 20° C. Those of ordinary skill in the art would be capable of selecting suitable methods for determining the refractive index of a component, based upon the teachings of this specification.

In certain embodiments, a magnitude of a difference in refractive index between the refractive index of the first component and the refractive index of the second component may be greater than or equal to 0.05, greater than or equal to 0.1, greater than or equal to 0.15, or greater than or equal to 0.2. In some embodiments, the magnitude of the difference in refractive index between the refractive index of the first component and the refractive index of the second component may be less than or equal to 0.25, less than or equal to 0.2, less than or equal to 0.15, or less than or equal to 0.1. Combinations of the above-referenced ranges are also possible (e.g., greater than or equal to 0.05 and less than or equal to 0.25). Other ranges are also possible.

While exemplary configurations for a plurality of droplets having two or more components, are described above, those skilled in the art would understand based upon the teaching of this specification that additional reconfigurations and rearrangements are also possible (e.g., the third component encapsulating the first and second components, etc.). Those skilled in the art would also understand, based upon the teachings of this specification, that droplets comprising four or more, five or more, or six or more components are also possible and that such droplets may also be stimulated such that two or more of the components have a radius of curvature between the two or more components that changes upon exposure to a stimulus.

The article may be stimulated for any suitable amount of time. For example, in some cases, the stimulus is added to the outer phase and not removed. In certain embodiments, the stimulus is applied for a specific amount of time. In some such embodiments, the stimulus may be applied for between about 1 second and about 10 seconds, between about 5 seconds and about 60 seconds, between about 30 seconds and about 2 minutes, between about 1 minute and about 5 minutes, between about 2 minutes and about 10 minutes, between about 5 minutes and about 15 minutes, between about 10 minutes and about 30 minutes, between about 15 minutes and about 60 minutes, between about 30 minutes and about 2 hours, between about 1 hour and about 6 hours, or between about 2 hours and about 24 hours. In some cases, the colloid may be stimulated for greater than 24 hours.

The term component, as used herein, generally refers to a portion of a droplet comprising a group of substantially similar molecules, a group of substantially similar compounds, and/or a phase (e.g., a non-aqueous phase, an aqueous phase) comprising such molecules and/or compounds. Those skilled in the art would understand that the term component is not intended to refer to a single molecule or atom. In some embodiments, the component is a liquid phase (e.g., a gas phase, an aqueous phase, non-aqueous phase) comprising a group of substantially similar compounds and/or molecules. For example, in some cases, each component may occupy at least about 1 vol %, at least about 2 vol %, at least about 5 vol %, at least about 10 vol %, at least about 20 vol %, at least about 50 vol %, at least about 70 vol %, at least about 90 vol %, at least about 95 vol %, or at least about 99 vol % of the total volume of the two or more components present within each droplet.

In some embodiments, the plurality of droplets comprise two or more components (e.g., three or more components, four or more components, five or more components) such that at least two of the two or more components change configuration (e.g., change radius of curvature between the two or more components, change the average focal length of the droplets) in the presence of a stimulus.

In some embodiments, the two or more components may be selected such that the interfacial tension between the two or more components allows for slight changes in interfacial tension (e.g., in response to a stimulus that changes the conformation and/or a property of the one or more components) to change the configuration of the two or more components within at least a portion of the plurality of droplets. Without wishing to be bound by theory, the morphology of the plurality of droplets is generally controlled by interfacial tension between two or more components within the droplets. For example, a droplet of any immiscible liquids F and H (at a given volume ratio) in a third immiscible liquid W has interfacial tensions of the H-W interface, $\gamma_H$, the F-W interface, $\gamma_F$, and the F-H interface, $\gamma_{FH}$. In some cases, $\gamma_F$ and $\gamma_H$ may be greater than $\gamma_{FH}$ such that combinations of liquids H and F have low interfacial tension just below a critical temperature of the two liquids. Generally, such multi-phase droplets may have equilibrium spherical shapes and may exhibit, for example, thermodynamically-permissible internal configurations including (1) liquid H completely engulfs liquid F (FIG. 2A), (2) liquids H and F form a Janus droplet (FIG. 2B), and (3) liquid F completely engulfs liquid H (FIG. 2C). These droplet configurations may be characterized, in some cases, by two contact angles, $\theta H$ between the H-W and F-H interfaces, and $\theta F$ between the F-H and F-W interfaces. The three interfacial tensions acting along the interfaces must be in equilibrium for the droplet configuration to be stable as can be expressed by the following equations:

$$\cos\theta_H = \frac{\gamma_F^2 - \gamma_H^2 - \gamma_{FH}^2}{2\gamma_{FH}\gamma_H}$$

$$\cos\theta_F = \frac{\gamma_H^2 - \gamma_F^2 - \gamma_{FH}^2}{2\gamma_{FH}\gamma_H}$$

In some cases, $\theta_H$ approaches 0 and $\theta_F$ approaches 0, yielding the following two relationships:

$$\theta_H=0 \Rightarrow \gamma_F=\gamma_H+\gamma_{FH}$$

$$\theta_F=0 \Rightarrow \gamma_H=\gamma_F+\gamma_{FH}$$

Figure 2A:
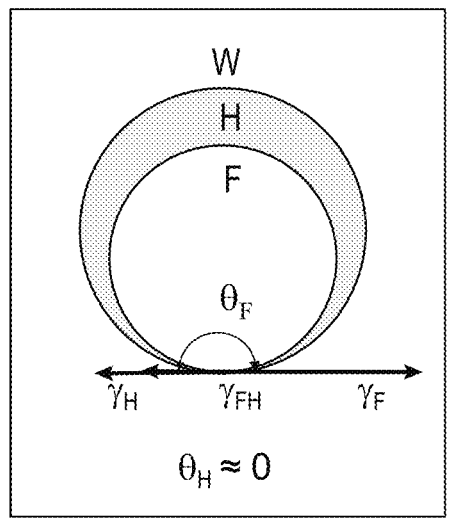
FIG. 2A is a schematic of the effect of interfacial tensions on the configuration of a droplet where encapsulation of a fluorocarbon (F) by a hydrocarbon (H) in water (W) is favored, according to one set of embodiments.
Figure 2B:
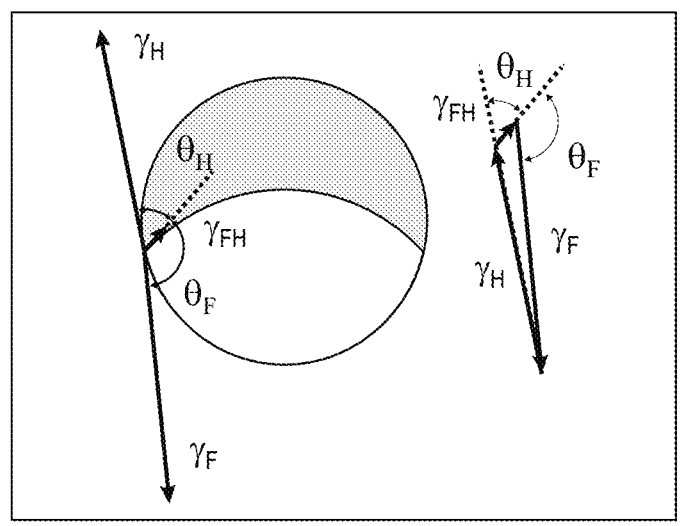
FIG. 2B is a schematic of the effect of interfacial tensions on the configuration of a droplet where the formation of a Janus droplet of a fluorocarbon (F) and a hydrocarbon (H) in water (W) is favored, according to one set of embodiments.
Figure 2C:
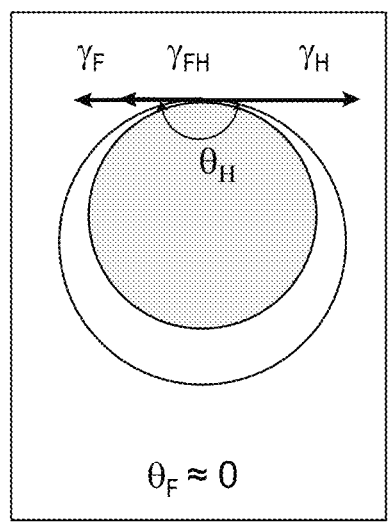
FIG. 2C is a schematic of the effect of interfacial tensions on the configuration of a droplet where encapsulation of a hydrocarbon (H) by a fluorocarbon (F) in water (W) is favored, according to one set of embodiments.

These equations generally indicate that when $\gamma_F-\gamma_H \geq \gamma_{FH}$, the droplets can rearrange to configuration (1) in FIG. 2A. Conversely, when $\gamma_H-\gamma_F \geq \gamma_{FH}$, the droplets can rearrange to configuration (3) in FIG. 2C. However, when the difference between $\gamma_H$ and $\gamma_F$ is on the order of $\gamma_{FH}$, the droplets can rearrange to a Janus droplet geometry associated with configuration (2) in FIG. 2B. As such, slight changes in the balance of $\gamma_H$ and $\gamma_F$ may induce changes in the droplet's morphology. In some embodiments, the two or more components may be selected such that changes in the balance of $\gamma_H$ and $\gamma_F$ result in the reversible change of configuration of the two or more components within a portion of the plurality of droplets.

In some embodiments, the droplet configuration may be characterized, in some embodiments, by a radius of curvature between two or more components (e.g., the F-H interface). The internal curvature may be set by the balance of interfacial tensions at the triple-phase contact line given by $$\frac{\gamma_H - \gamma_F}{\gamma_{HF}} = (R_d^2 + 2R_i l - l^2)/(2R_i R_d)$$

Where $R_d$ is the radius of the droplet and $R_i$ is the internal radius of curvature (i.e. the radius of curvature between the interface between the first component and the second component such as the F-H interface).

In certain embodiments, each component is different and a fluid. In some cases, one or more components may be a gas. In some embodiments, one or more components may be a liquid.

In some embodiments, at least one of the two or more components comprises a hydrocarbon (e.g., a hydrocarbon fluid). Non-limiting examples of suitable hydrocarbons include alkanes (e.g., hexane, heptane, decane, dodecane, hexadecane), alkenes, alkynes, aromatics (e.g., benzene, toluene, xylene, benzyl benzoate, diethyl phalate), oils (e.g., natural oils and oil mixtures including vegetable oil, mineral oil, and olive oil), liquid monomers and/or polymers (e.g., hexanediol diacrylate, butanediol diacrylate, polyethylene glycols, trimethylolpropane ethoxylate triacrylate), alcohols (e.g., butanol, octanol, pentanol, ethanol, isopropanol), ethers (e.g., diethyl ether, diethylene glycol, dimethyl ether), dimethyl formamide, acetonitrile, nitromethane, halogenated liquids (e.g., chloroform, dichlorobenzene, methylene chloride, carbon tetrachloride) brominated liquids, iodinated liquids, lactates (e.g., ethyl lactate), acids (e.g., citric acid, acetic acid), trimethylamine, liquid crystal hydrocarbons (e.g., 5-cyanobiphenyl), combinations thereof, and derivatives thereof, optionally substituted. In some embodiments, the hydrocarbon comprises a halogen group, sulfur, nitrogen, phosphorous, oxygen, or the like. Other hydrocarbons or organic chemicals are also possible. In some embodiments, the outer phase comprises a hydrocarbon.

In certain embodiments, the hydrocarbon may be selected based upon its refractive index and/or transmissivity to a particular wavelength of electromagnetic radiation (e.g., visible light). In some embodiments, the hydrocarbon may be substantially transparent to visible light.

In some embodiments, at least one of the two or more components comprises a fluorocarbon (e.g., a fluorocarbon fluid). Non-limiting examples of suitable fluorocarbons include fluorinated compounds such as perfluoroalkanes (e.g., perfluorohexanes, perfluorooctane, perfluorodecalin, perfluoromethylcyclohexane), perfluoroalkenes (e.g., perfluorobenzene), perfluoroalkynes, and branched fluorocarbons (e.g., perfluorotributylamine). Additional non-limiting examples of suitable fluorocarbons include partially fluorinated compounds such as methoxyperfluorobutane, ethyl nonafluorobutyl ether, 2H,3H-perfluoropentane, trifluorotoluene, perfluoroidodide, fluorinated or partially fluorinated oligomers, 2,2,3,3,4,4,5,5,6,6,7,7,8,8,9,9-hexadecafluorodecane-1,10-diyl bis(2-methylacrylate), perfluoroiodide, and 2-(trifluoromethyl)-3-ethoxydodecafluorohexane. Other fluorocarbons are also possible. In some embodiments, the outer phase comprises a fluorocarbon.

In certain embodiments, the fluorocarbon may be selected based upon its refractive index and/or transmissivity to a particular wavelength of electromagnetic radiation (e.g., visible light). In some embodiments, the fluorocarbon may be substantially transparent to visible light.

In some embodiments, at least one of the two or more components comprises a silicone such as silicone oil. Non-limiting examples of suitable silicone oils include polydimethylsiloxane and cyclosiloxane fluids. In some embodiments, the outer phase comprises a silicone.

In certain embodiments, the composition of each component (e.g., the first component, the second component) may be selected based upon its refractive index and/or transmissivity to a particular wavelength of electromagnetic radiation (e.g., visible light). In some embodiments, each component may be substantially transparent to visible light.

In some embodiments, at least one of the two or more components comprises a dye (e.g., a fluorescent dye). In some cases, the dye may be present in the component having a relatively higher refractive index than the other component.

In certain embodiments, two or more components each comprise a dye. In some cases, a first dye may be present in a first component and a second dye is present in a second component. The dye may be present in a component in any suitable amount.

Non-limiting examples of suitable dyes include perylenediimide, perylene fluorescein, and tetramethylrhodamine.

In some embodiments, the dye has a particular characteristic emission wavelength (e.g., the maximum intensity emitted in the visible spectrum). For example, in some embodiments, the dye has a characteristic emission wavelength of greater than or equal to 380 nm, greater than or equal to 400 nm, greater than or equal to 425 nm, greater than or equal to 450 nm, greater than or equal to 475 nm, greater than or equal to 500 nm, greater than or equal to 525 nm, greater than or equal to 550 nm, greater than or equal to 575 nm, greater than or equal to 600 nm, greater than or equal to 625 nm, greater than or equal to 650 nm, greater than or equal to 675 nm, or greater than or equal to 700 nm. In certain embodiments, the dye has a characteristic emission wavelength of less than or equal to 750 nm, less than or equal to 700 nm, less than or equal to 675 nm, less than or equal to 650 nm, less than or equal to 625 nm, less than or equal to 600 nm, less than or equal to 575 nm, less than or equal to 550 nm, less than or equal to 525 nm, less than or equal to 500 nm, less than or equal to 475 nm, less than or equal to 450 nm, less than or equal to 425 nm, or less than or equal to 400 nm. Combinations of the above-referenced ranges are also possible (e.g., greater than or equal to 380 nm and less than or equal to 750 nm). Other ranges are also possible.

In some embodiments, a first dye has a first characteristic emission wavelength and a second dye has a second characteristic emission wavelength, different than the first characteristic emission wavelength.

In some embodiments, at least one of the two or more components comprises water. In some embodiments, at least one of the two or more components comprises an ionic liquid (e.g., an electrolyte, a liquid salt). Non-limiting examples of ionic liquids include 1-allyl-3-methylimidazolium bromide, 1-allyl-3-methylimidazolium chloride, 1-benzyl-3-methylimidazolium hexafluorophosphate, 1-butyl-1- methylpyrrolidinium hexafluorophosphate. Other ionic liquids are also possible. In some embodiments, the outer phase comprises water.

In certain embodiments, at least one of the two or more components comprises a deuterated compound (e.g., a deuterated hydrocarbon, a deuterated fluorocarbon). Droplets having components comprising deuterated compounds may be useful in various applications including, for example, NMR and MRI.

In some embodiments, at least one of the two or more components comprises a polymer (e.g., polyethylene glycol). In certain embodiments, the polymer is a block copolymer. In certain embodiments, the polymer is a liquid crystal polymer (e.g., a thermotropic liquid crystal polymer). In certain embodiments, the polymer is a biopolymer (e.g., gelatin, alginate). In some cases, the polymer may be transparent to a particular range of electromagnetic radiation (e.g., to visible light).

In some embodiments, at least one of the two or more components comprises a liquid crystal. Non limiting examples of liquid crystals include thermotropic liquid crystals (e.g. 4-Cyano-4'-pentylbiphenyl), lyotropic liquid crystals, and metallotropic liquid crystals (e.g. complexes of $ZnCl_2$).

In some embodiments, at least one of the two or more components comprises a gas.

Non-limiting examples of combinations of components present in the plurality of droplets described herein include hexane and perfluorohexane, carbon tetrachloride and perfluorohexane, chloroform and perfluorohexane, hexane and perfluorodecalin, hexane and perfluoromethylcyclohexane, hexane and perfluorotributylamine, isopropanol and hexadecane, ethyl lactate and heptane, acetic acid and decane, and triethylamine and water. Other combinations and materials are also possible.

In some embodiments, at least one of the two or more components comprises a combination of the materials described above (e.g., comprising a hydrocarbon, a fluorocarbon, a silicone, or combinations thereof). In some embodiments, a first component may comprise at least two miscible compounds (e.g., or two compounds at a temperature at which the compounds are miscible), both or all of which may be immiscible with a second component (e.g., the first component comprises a mixture of hydrocarbons and the second component comprises a fluorocarbon).

In some embodiments, one or more components and/or the outer phase comprises an additional compound dispersed in the one or more components and/or the outer phase. In certain embodiments, the additional compound is dispersible in a first component and not dispersible in a second component. In some cases, at least a portion of the additional compound is dispersible in the first component and not dispersible in the second component (e.g., a surfactant). In some embodiments, the additional compound may be dispersible or not dispersible in the outer phase. Non-limiting examples of suitable additional compounds include particles (e.g., magnetic particles/nanoparticles, silica particles), biological molecules (e.g., insulin), pharmaceutical compounds, polymers, surfactants, cells, bacteria, viruses, active pharmaceutical ingredients, and metals or metal particles. Other additional compounds are also possible and those skilled in the art would be capable of selecting such compounds based upon the teachings of this specification.

Those skilled in the art would be capable of selecting suitable components such that the components have a first configuration (i.e. arrangement) in the absence of a stimulus and a second configuration (i.e. arrangement) in the presence of the stimulus. In some embodiments, the components have a first configuration (i.e. arrangement) in the presence of a first stimulus and a second configuration (i.e. arrangement) in the presence of a second stimulus.

The outer phase may comprise any suitable material. In some embodiments, the outer phase is a solid. In certain embodiments, the outer phase is a liquid. In some embodiments, the outer phase is a gel. Generally, the two or more components comprising the plurality of droplets may be substantially immiscible with the outer phase. In some embodiments, the outer phase is an aqueous phase (e.g., comprising water, a hydrocarbon, a fluorocarbon). In certain embodiments, the outer phase is a non-aqueous phase (e.g., comprising a silicone, comprising a polymer, comprising an elastomer, comprising a glass). In an exemplary embodiment, the outer phase is a polymer. In another exemplary embodiment, the outer phase is an elastomer. In yet another exemplary embodiment, the outer phase is a glass. In some embodiments, the non-aqueous phase comprises a hydrocarbon, a fluorocarbon, a silicone, or the like, as described above in the context of the two or more components, and is substantially immiscible with at least one of the two or more components. The use of a non-aqueous outer phase may be advantageous in certain applications including, but not limited to, tunable lenses.

Those skilled in the art would be capable, based upon the teachings of the specification and the examples below, of selecting suitable materials for use as an outer phase based upon the miscibility of those materials (e.g., such that the two or more components may be substantially immiscible with the outer phase). In some embodiments, the article comprises a plurality of droplets dispersed in the outer phase wherein the outer phase is a liquid (e.g., a liquid polymer, a gel precursor) and is solidified (e.g., polymerized) or gelled (e.g., crosslinked). Those skilled in the art would be capable of selecting suitable methods for solidifying or gelling the outer phase.

In some embodiments, the outer phase is transparent (e.g., to a particular wavelength of electromagnetic radiation such as visible light) such that a particular wavelength of electromagnetic radiation (e.g., visible light) may be transmitted through the outer phase and interact with the plurality of droplets described herein.

In certain embodiments, an article comprising a plurality of droplets having two or more components may be formed. In some such embodiments, the article may be stimulated such that the radius of curvature between two components and/or the average focal length of the droplet changes. After stimulating, the outer phase may be solidified (e.g., polymerized, gelled, or the like) such that the change in radius of curvature and/or average focal length is maintained. In certain embodiments, the plurality of droplets may be stimulated after solidification of the outer phase such that two or more components in at least a portion of the plurality of droplets obtain a new configuration.

In some embodiments, the article further comprises an additional compound such as an amphiphilic compound. In certain embodiments, the amphiphilic compound is miscible in the outer phase. In some embodiments, the amphiphilic compound is miscible in at least one of the two or more components. In certain embodiments, the amphiphilic compound has a greater miscibility in at least one of the two or more components than a miscibility in the outer phase. In some embodiments, the amphiphilic compound is dispersed at the interface between the outer phase and the plurality of droplets. In certain embodiments, the amphiphilic compound is dispersed at the interface between at least two of the two or more components. The amphiphilic compound may preferentially interact with one or more components or the outer phase. Those skilled in the art would be capable of selecting a suitable amphiphilic compound based upon the teachings of the specification and examples below. Miscibility may be determined, for example, as described above using an inverted pendant drop goniometer.

In some embodiments, the amphiphilic compound is a surfactant. Non-limiting examples of suitable surfactants include fluorosurfactants (e.g., commercially available fluorosurfactants such as Zonyl® or Capstone®), anionic surfactants (e.g., sodium dodecyl sulfate (SDS)), cationic surfactants (e.g., alkyltrimethyl ammonium chloride, alkylmethyl ammonium bromide), non-ionic surfactants (e.g., alkyl poly(ethylene oxide)), zwitterionic surfactants (e.g., alkyl betain, $C_8$-lecitin), polymeric surfactants, gemini surfactants, particulate surfactants (e.g., graphene oxide, silica particles), and combinations thereof. Other surfactants are also possible. In an exemplary set of embodiments, the surfactant comprises boronic acid.

In some embodiments, the amphiphilic compound is a nucleic acid (e.g., DNA, RNA). In certain embodiments the amphiphilic compound comprises an amino acid (e.g., a peptide, a protein). In some embodiments, the amphiphilic compound comprises a biomaterial. Non-limiting examples of suitable biomaterials include carbohydrates or derivatives thereof, saccharides or derivatives thereof (e.g., sialic acid), lipids or derivatives thereof, enzymes, chromophores or the like. Those skilled in the art would be capable of selecting suitable biomaterials based upon the teachings of the specification and the examples below.

In some embodiments, the amphiphilic compound comprises a perfluorinated segment. In some embodiments, the amphiphilic compound comprises ethylene glycol.

In some embodiments, the amphiphilic compound is capable of forming metal complexes.

In certain embodiments, the amphiphilic compound is graphene oxide.

In some embodiments, the amphiphilic compound may be a particle (e.g., a silica particle, a polymer particle, a Janus particle, a nanoparticle, a gel particle).

In some embodiments, the amphiphilic compound is added to an article (e.g., a article comprising an outer phase and a plurality of droplets comprising two or more components, dispersed within the outer phase). In some such embodiments, the amphiphilic compound may act as a stimulus.

The term stimulating as used herein generally refers to the addition, removal, or change of a condition, a compound, or the environment (e.g., temperature, pressure, pH) such that the radius of curvature between two or more components is changed and/or the average focal length of the droplet is changed. Those skilled in the art will be capable of selecting suitable stimulus for use with the article described herein based upon the teachings of the specification and will understand stimulation does not comprise substantially removing a component and/or replacing the entirety of a component with a new component. However, in some embodiments, stimulating the article may result in a component, additional compound, and/or surfactant present in the article changing molecular conformation such that the component, additional compound, and/or amphiphilic compound is chemically distinguishable after stimulation (e.g., an acid cleavable component, additional compound, and/or amphiphilic compound that cleaves in the presence of an acid, a photosensitive component, additional compound, and/or amphiphilic compound that changes conformation or molecular structure after exposure to light) as compared to before stimulation.

In some embodiments, stimulating the article comprises exposing the colloid to an external stimulus (e.g., such that the radius of curvature between two or more components is changed). In some cases, the external stimulus may comprises electromagnetic radiation, ionizing radiation, a magnetic field, an electric field, a mechanical force (e.g., pressure, direct contact), or combinations thereof. Those skilled in the art would be capable of selecting suitable components and methods of applying such external stimuli based upon the teachings of the specification and examples below. For example, in some such embodiments, at least one of the two or more components may comprise a magnetic particle such that, in the presence of a magnetic field, the at least one of the two or more components transposes or changes configuration with at least one additional component of the two or more components.

In certain embodiments, the external stimulus comprises photochemical stimulation (e.g., exposing the article comprising a plurality of droplets to light). The light may comprise any suitable wavelength, including but not limited to radio waves (e.g., a wavelength between about 1 cm and about 100 m), infrared light (e.g., a wavelength between about 700 nm and about 1 cm), visible light (e.g., a wavelength between about 400 nm and about 700 nm), ultraviolet (UV) light (e.g., a wavelength between about 10 nm and about 400 nm), and x-rays (e.g., a wavelength between about 0.01 nm and about 10 nm).

In some embodiments, stimulating the article comprises changing the temperature of the colloid (e.g., such that the radius of curvature between two or more components is changed and/or the average focal length of the droplet is changed). In certain embodiments, changing the temperature of the article comprises heating the article. In some embodiments, changing the temperature of the article comprises cooling the article. Those skilled in the art would be capable of selecting suitable methods of heating or cooling the article based upon the teaching of the specification and examples below. In some embodiments, stimulating the article comprises local generation of heat in the vicinity of the article, for instance using an infra-red laser or any other laser with a wavelength that is partially absorbed in the surrounding medium.

In certain embodiments, stimulating the article comprises applying a force and/or pressure to the article such that the radius of curvature between two or more components is changed and/or the average focal length of the droplet is changed.

In some embodiments, stimulating the article comprises adjusting the ionic strength and/or adjusting the pH of the outer phase. For example, in some embodiments, adjusting the pH of the outer phase comprises adding an acid (e.g., HCl) or a base (e.g., NaOH). For example, in some such embodiments, at least one of the two or more components comprises a pH-sensitive surfactant (e.g., N-dodecylpropane-1,3-diamine) and/or an acid-cleavable surfactant (e.g., sodium 2,2-bis(hexyloxy)propyl sulfate) such that the pH-sensitive surfactant and/or the acid-cleavable surfactant changes charge and/or cleaves in the presence of an acid or a base, such that the radius of curvature between two components is changed and/or the average focal length of the droplet is changed.

In certain embodiments, stimulating the article comprises adding an analyte to the article. The analyte may comprise any suitable material (e.g., a vapor analyte, a liquid analyte, a solid analyte) such that the incorporation of the analyte into a portion of the plurality of droplets or the outer phase causes the two or more components to change the radius of curvature and/or causes the droplet to change the average focal length. Those skilled in the art would be capable of selecting analytes and components suitable for article based upon the teaching of the specification and the examples below. Non-limiting examples of suitable analytes includes a biological compound, a drug, a macromolecule, a salt, an electrolyte, an enzyme, a nucleic acid, a carbohydrate, a peptide, a protein, a lipid, a phosphate, a sulfonate, a virus, a pathogen, an oxidant, a reductant, a toxin, a chemical warfare agent, an explosive, carbon dioxide, a surfactant, or combinations thereof.

Article described herein may be formed using any suitable method. For example, in some embodiments, an outer phase material, a first component, and a second component are mixed and emulsified, forming an outer phase and a plurality of droplets in the outer phase having a first component and a second component at least partially encapsulated by the first component. Suitable methods for emulsifying the fluid are known in the art and may comprise sonication, high shear mixing, shaking, passing the fluid through a membrane, or injecting the two or more components into the outer phase through a small diameter channel (e.g., a microchannel(s)).

In certain embodiments, the outer phase material, the first component, and the second component may be mixed at a temperature at which the first component material and the second component material are miscible. In some such embodiments, the temperature of the mixture may be changed (e.g., increased, decreased) to a temperature such that the first component and the second component are immiscible and form a plurality of droplets in the outer phase having a first component and a second component at least partially encapsulated by the first component. While much of the description herein applies to two components, those skilled in the art would understand that such methods may be useful for the formation of colloids comprising a plurality of droplets having three or more, four or more, or five or more components. Additional suitable methods for forming articles comprising a plurality of droplets are described, for example, in co-owned U.S. Patent Publication Number 2016/0151753, entitled "Compositions and Methods for Forming Emulsions", filed Oct. 30, 2015; and in co-owned U.S. Patent Publication Number 2016/0151756, entitled "Compositions and Methods for Arranging Colloid Phases", filed Oct. 30, 2015, each of which is incorporated herein by reference in its entirety.

U.S. Provisional Application Ser. No. 62/454,663, filed Feb. 3, 2017, entitled "Tunable Microlenses And Related Methods", is also incorporated herein by reference in its entirety for all purposes.

The articles described herein may be used, for example, in a device such as an optical imaging system, a miniaturized optical imaging system, a miniaturized tomographic imaging system for 3D image acquisition, a miniaturized integral imaging device, an optical image projecting system, a confocal imaging device, and/or an auto-stereoscopic display. The device may comprise a plurality of droplets arranged to create a responsive, reconfigurable illumination source. Advantageously, articles described herein may alleviate the need of mechanical focusing to be employed in, for example, devices such as ophthalmology instruments and/or endoscopes.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

EXAMPLES

The following examples illustrate embodiments of certain aspects of the invention. It should be understood that the methods and/or materials described herein may be modified and/or scaled, as known to those of ordinary skill in the art.

Example 1

The following examples relate to the optical characteristics of a new generation of fluidic tunable compound micro-lenses. Exemplary compound micro-lenses were composed of hydrocarbon and fluorocarbon liquids that form stable bi-phase emulsion droplets in aqueous media. Combinations of transparent fluids Fluorinert FC-770 ($n_{FC}$=1.27) with heptane ($n_{HP}$=1.387), or hexane ($n_{HX}$=1.375) were used. The refractive index of the hydrocarbon constituent was higher than the refractive index of water ($n_W$=1.33), while the fluorinated component had a refractive index lower than that of water. The refractive index contrast at each material interface as well as the curvature of each interface contributes to the focusing power of a refractive optical element. Therefore, such fluid combinations could allow for a wide tuning range of the emulsion lenses' focal length, thereby enabling switching between converging or diverging lens geometries. The complex droplet lenses (e.g., lenses comprising a plurality of droplets) can be easily fabricated on a large scale using a temperature-induced phase separation technique appropriate for combinations of liquids having a relatively low upper critical solution temperature. Such complex droplets can also be dynamically reconfigured between double emulsion and Janus (two-sided) morphologies through application of external stimuli, which makes these droplets very promising as highly tunable compound lenses. The adjustability in focal length of the lenses as well as their microscopic and macroscopic light manipulation characteristics was demonstrated.

Modeling of Emulsion Droplets as Tunable Lenses

Figure 3A:
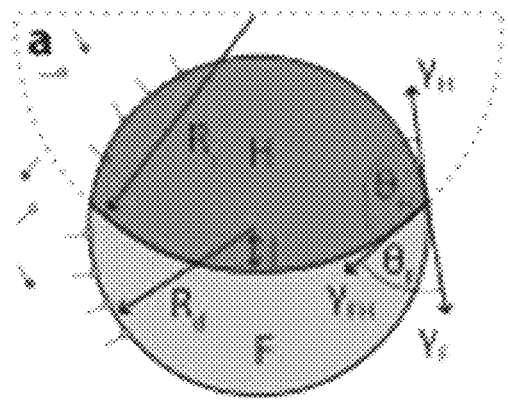
FIG. 3A is a schematic of the geometry of a two component droplet, according to one set of embodiments.
Figure 3B:
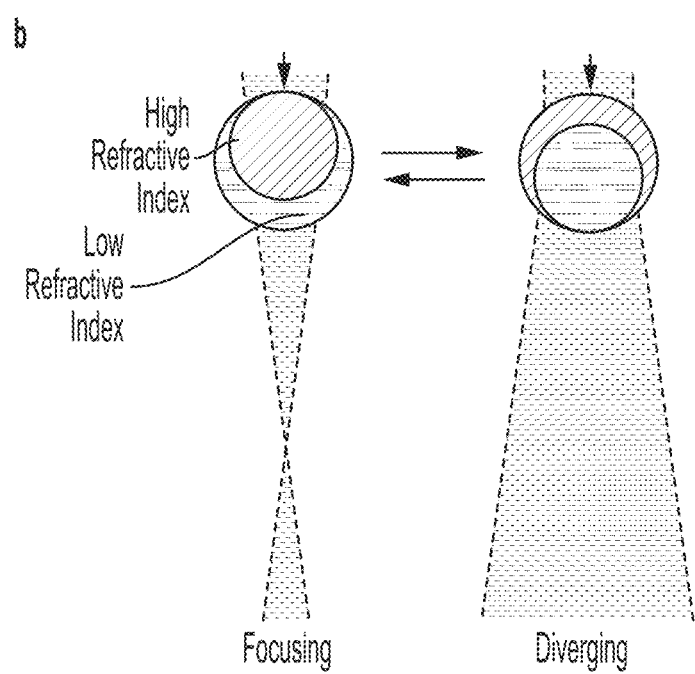
FIG. 3B is a schematic of switching between focusing and diverging geometries, according to one set of embodiments.

For these particular exemplary emulsions, the curvature of the internal interface formed between the immiscible phases can be adjusted using surfactants that modify the relative interfacial tensions between the droplet phases and water. Surfactant-mediated modification of interfacial tensions resulted in a variation of the contact angles at the triple-phase contact line. This relates the radius of curvature of the lenses' internal interface, which in turn affects the optical properties of the droplets (FIGS. 3A-3B). To demonstrate how the controlled, dynamic variation of the complex droplets' geometry could induce a tunable interaction with light, a ray-tracing algorithm was implemented in MATLAB. The overall droplet shape was assumed to be spherical, which is an appropriate approximation when the interfacial tension between the droplet phases is much smaller than the interfacial tensions between the droplet constituents and the aqueous medium (FIG. 3A). This was the case for working temperatures close to the critical temperature of the internal fluids. For the droplet diameters on the order of 100 μm discussed here, the internal interface can be considered to be spherical, since the ratio of gravitational to surface tension forces is relatively small. Under these assumptions, the distance l of the interface from the center of the overall drop is given by $$(R_d - l)^2(l^2 + 4R_iR_d + 2R_dl - 3R_il - 3R_d^2) + \frac{16R_d(R_i - l)}{1 + v_r} = 0, \quad (1)$$

where $R_d$ is the radius of the drop, $R_i$ is the internal radius of curvature (i.e. the radius of curvature of the interface between the first component and the second component), and $v_r$ is the volume ratio of the internal droplet phase to the outer droplet phase. The internal curvature is set by the balance of interfacial tensions at the triple-phase contact line [47] given by $$\frac{\gamma_H - \gamma_F}{\gamma_{HF}} = (R_d^2 + 2R_il - l^2)/(2R_iR_d). \quad (2)$$

Figure 3C:
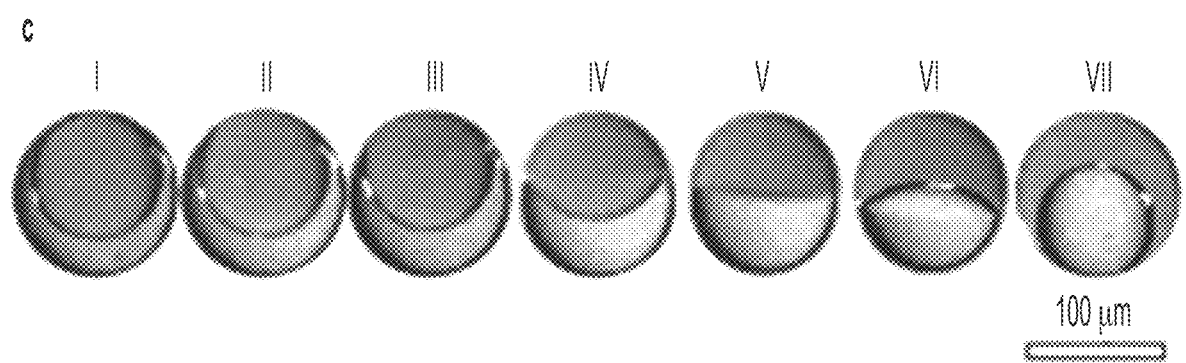
FIG. 3C is a side view optical micrograph of exemplary droplets composed of FC-770 and heptane with varying internal interface curvature, according to one set of embodiments.
Figure 3D:
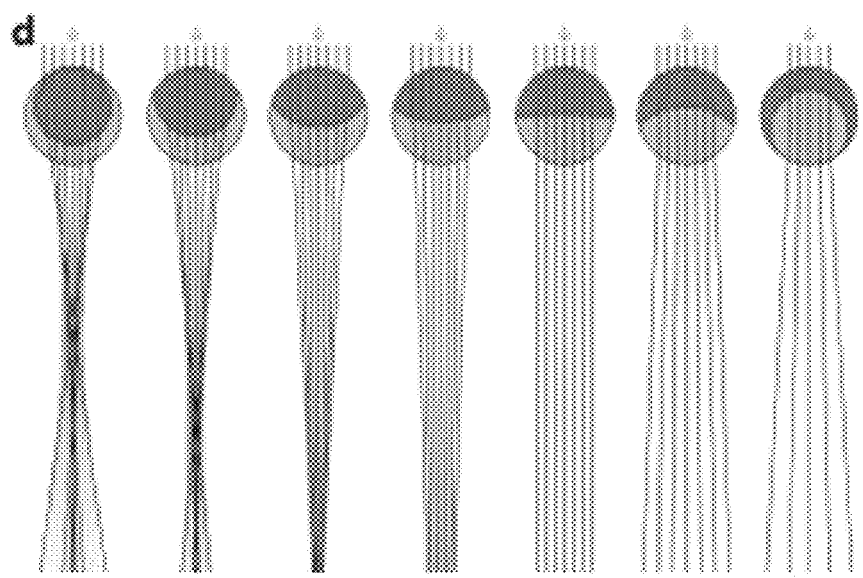
FIG. 3D shows corresponding ray tracing simulations showing the propagation of light rays through the droplets, according to one set of embodiments.

When the optical axis is aligned with the droplets' symmetry axis, the optical system is axisymmetric and can be modeled in two dimensions. The droplets' symmetry axis aligns with the gravitational field due to the difference in density between the light hydrocarbon phase and the dense fluorocarbon phase. This alignment was exploited in the theoretical and experimental study of the droplets' optical characteristics. The ray-tracing calculations predicted that the double emulsion droplets with a high refractive index core phase and a lower refractive index shell phase can focus light, while an inversion of this droplet geometry results in diverging lenses (FIG. 3B-3D). By adjusting the droplets' internal interface curvature, each droplet can be tuned between a converging lens with varying positive optical power and a diverging lens with varying negative optical power.

3D Focus Scans Behind Droplets with Varying Morphology

Figure 4A:
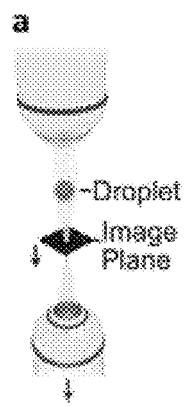
FIG. 4A is a schematic of the setup used to record the light field behind the droplets, according to one set of embodiments.
Figure 4B:
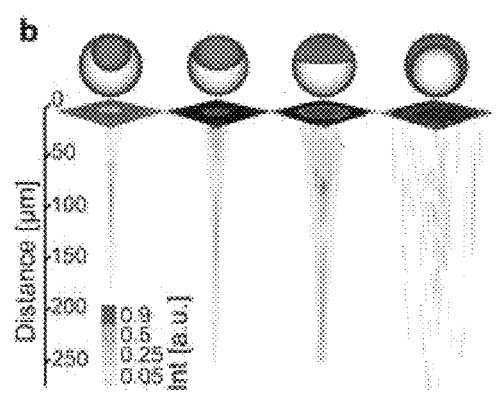
FIG. 4B are iso-surfaces of the reconstructed light fields behind the droplets for different internal droplet morphologies, according to one set of embodiments.

The interfacial tensions that determine the droplet morphology can be tailored by controlling, for example, the concentration and ratio of surfactant species added to the aqueous phase. In these experiments, a combination of both a hydrocarbon-stabilizing surfactant, such as sodium dodecyl sulfate (SDS), and a fluorocarbon-stabilizing surfactant, such as Zonyl FS-300 or Capstone FS-30, were used. In order to map the light field behind heptane—FC-770 droplets, the droplets were illuminated with a collimated beam of quasi-monochromatic light of a 540 nm wavelength, and the light field in the volume behind the droplets was recorded by scanning the image plane of an inverted microscope (FIG. 4A). Variation in the concentrations of SDS and Capstone FS-30 in the surfactant mixture added to the aqueous phase allowed for alteration of the droplets' internal interface curvature (e.g., the radius of curvature between two immiscible components in the droplet) resulting in a variation of their focal length (FIG. 4B).

Quantification of the Droplet Lenses' Optical Characteristics

The native function of a lens is generally to form an image. In order to evaluate the image formation capabilities of the droplets, including experimentally quantifying their optical power, an object was placed in front of the droplets and used them to project an image at varying distances (FIG. 5A). Specifically, a grid pattern was projected in the aqueous medium above the droplets. The image of the object formed by the droplets was recorded using an inverted microscope. By varying the concentrations of SDS and Zonyl surfactant in the aqueous medium surrounding the droplets (e.g., stimulating the droplets by adjusting the concentration of the surfactant in the outer phase), the internal interface shape could be adjusted. By projecting the image of an object through the lenses and by measuring object-to-lens and lens-to-image distances (FIGS. 5A-5D), the micro-lenses' effective focal length was quantified.

The internal interface curvature of the droplets was determined by fitting a circle to the interface shape observed in side-view micrographs (FIG. 5E, inset), taking into account refraction due to the outer droplet phase. Knowing this curvature, the expected effective focal length acquired using the paraxial approximation and the ray transfer matrix calculations could be compared with the experimentally determined effective focal length (FIG. 5E). It was found that FC-770-heptane droplets formed with volume ratio 1:1 can vary in focal length from 3.5 times the diameter of the droplet to infinity, and can switch between positive and negative focal lengths. For example, a double emulsion droplet of 100 μm diameter, with heptane as the core phase and the fluorocarbon FC-770 as the shell phase, had a focal length of 350 μm and acted as a converging lens. While the experiments presented here were restricted to lenses with constant volume ratio of 1:1, a variation in volume ratio was observed to result in a change in radius of curvature of the internal interface and consequently in changes of the lenses' focal length provided that the triple phase contact angles are kept relatively constant. Raytracing results of droplets with constant contact angle and varying volume ratio can be seen in FIGS. 9A-9B. This additional degree of freedom suggests interesting future perspectives for multi-fluid lens optical systems, especially in terms of higher order aberration correction.

The configuration of the droplet in FIG. 3C (V) is a special case where the droplets have an effective focal length of infinity. For the FC-770-heptane emulsions, this occurs when the interface is nearly flat; the refraction at the water-heptane interface is effectively cancelled by a compensating refraction at the FC-770-water interface. The lenses' numerical aperture, given by $$NA = n \sin\left(\tan^{-1}\frac{D}{2f}\right),$$

generally decreases with increasing focal length. Here n=1, since the image was formed in air beneath the droplet lenses, which were positioned on top of a glass coverslip.

To estimate the droplet lenses' optical quality, two metrics used in the design of lenses were utilized: First, the two-point resolution criterion postulated by Rayleigh in 1896 generally provides a measure for the minimum distance between two object points for which these two points can still be distinguished unambiguously in the image projected by a lens. Second, the Abbe diffraction limit generally defines the maximum spatial frequency of a sinusoidally varying intensity pattern that can be resolved with sufficient contrast by the lens. The standard definition of the Rayleigh two-point resolution criterion were applied, which consists of determining the distance from the center of the lenses' point spread function (PSF) to its first minimum. With this definition, the theoretically achievable resolution $r_{th}$ of a diffraction-limited lens is given by $$r_{th} = 1.22 \cdot \frac{\lambda}{2NA}.$$

The PSF of droplets was experimentally determined by imaging the focus formed by droplets that were illuminated with collimated light. A white light source was used but only the image information of the camera's red channel was utilized (with maximum quantum efficiency at 620 nm). The experiment was performed with droplets with a highly curved internal interface. From the experimental PSF estimate the droplets were found to resolve details down to a feature size of $r_{exp}$=3.7 μm. The theoretical two-point resolution limit of a comparable diffraction limited lens is generally $r_{th}$=3.1 μm. An estimate of the Modulation Transfer Function (MTF) of the same droplets based on the experimentally obtained PSF estimate was also determined. The MTF's cut-off frequency at a remaining image contrast of at least 10% of the original object contrast was found to be $f_{exp}^{10\%}$=0.22 cycles per μm, which corresponds to a sinusoidal intensity variation of 4.5 μm period. The theoretical line pattern resolution limit for a comparable lens is 3.2 μm ($f_{exp}^{10\%}$=0.31 cycles per μm). The discrepancy between the measured and the theoretical resolution limits may be due to spherical aberrations.

Using micro-fluidics, emulsion lenses with a highly uniform size distribution were produced (see FIGS. 13A-13D). Droplets of the same size, with the same volume ratio and matching internal interface curvature, generally have matching focal lengths. FIGS. 13B-13D demonstrate that when light is focused through several lenses of the same size, all point spread functions generally have similar shapes, and thus very similar focal lengths, and numerical apertures.

Potential Applications of Tunable Droplet Compound Lenses

To explore potential application scenarios, the micro-scale optical tunability of the droplets was determined if it could be translated to observable differences in macroscopic properties. In the case of a strongly focusing double emulsion, finite difference time domain (FDTD) simulations show that a single droplet may scatter light in a cone with an opening angle of almost 30°. On the other hand, a Janus droplet with a nearly flat interface transmits light with an angular spread of only a few degrees. To test whether this phenomenon could be observed to create droplet-based displays, films of polydisperse emulsion droplets were formed covering an area of several cm². In order to induce localized variations in droplet morphology, an optically switchable azobenzene surfactant was employed to change the morphology of the emulsions droplets. Irradiation of selected areas of droplets with UV light using a "smiley face" photomask, inducesda transformation of the exposed droplets from the transparent Janus geometry to a strongly scattering double emulsion geometry. Simple visual inspection reveals a clear optical contrast when viewed in transmission (FIGS. 6A-6B). Exposure to UV radiation and blue light allowed for reversibly switching the compound lenses between these two morphologies again and again, without any signs of degradation The FDTD simulations predicted that droplets with an internal curvature somewhere between the extremes of the double emulsion state and the flat-interface Janus configuration scatter light in a cone with an opening angle larger than that of the Janus droplets, but smaller than that of the double emulsions (FIG. 6A). Whether these optical differences could create surfaces with controlled spatial variation in perceived brightness was tested (FIG. 6C) by finely adjusting the droplet's internal curvature through careful tuning of the UV light exposure. To this end, a droplet assembly was irradiated through a MIT photomask in which a piece of scattering Scotch tape was placed over the stem of the "i" to partially block UV transmission. A significant decrease in pattern brightness was observed in the modified photomask region of the sample when observed in direct transmission (FIG. 6D). Without wishing to be bound by theory, the double emulsions scatter light into a larger angular range; consequently, when the same sample is viewed at an angle, the areas that were exposed to the UV radiation appeared brighter. Hence, an inversion of the image (FIG. 6E) was observed, consistent with FDTD simulations. In short, image contrast in the droplet films can be varied by photo-chemically modulating (e.g., stimulating) the degree of curvature of the droplets' internal interface.

The droplets' variable focal length and their capability to form images are properties that are particularly relevant for a variety of application scenarios related to miniaturized imaging devices. Arrays of micro-lenses, for example, find application in digital integral microscopic imaging and photography. One of the main challenges in three-dimensional image acquisition is the limited depth of field. The tunable focal length lenses could provide the means to address this limit. To evaluate whether the lenses could be considered for integral imaging applications, monodisperse bi-phase double emulsion droplets were produced and arranged them in a close-packed monolayer. In such a multi-lens arrangement, each lens projected a plane elemental image of an object at slightly different angles (FIGS. 6F-6H). Therefore, each lens had a different perspective of an imaged 3D object. Computational recombination of the images from multiple lenses should then allow for the capturing the three-dimensional forms of imaged objects.

Complex emulsions of optically distinct, immiscible hydrocarbons and fluorocarbons in aqueous media were shown to form droplets that act as compound lenses with a tunable droplet-internal optical interface. Adjustment of the droplet's interfacial tensions with the aqueous phase allowed for a continuous and reversible variation from double emulsions, through Janus configurations, to inverted double emulsions. Depending on their configuration, the droplets showed different interactions with light. Double emulsions with the optically denser fluid as the droplet-core phase strongly focused light. Janus droplets did not significantly disturb the light wavefront, when the surface normal of the internal interface is aligned with the light propagation direction. Double emulsions with the optically denser fluid as the droplet-shell phase show strong light scattering. A controlled modification of the droplet morphology consequently resulted in a predictable variation of the droplets' light focusing and scattering behavior.

Depending on their morphology, the droplets can act as converging lenses projecting real inverted images, or as diverging lenses forming virtual upright images. These emulsion-based micro-lens droplets had a dynamically tunable focal length that can vary from ±3.5× the drop diameter to ±infinity. With a resolution limit around 4 μm, the reconfigurable micro-lenses did not show diffraction-limited performance (resolution limit of 3 μm for a comparable diffraction-limited micro-lens), which was attributed to the presence of spherical aberrations. Such microscopic droplet compound lenses have clear advantages in applications where device size, simplicity, and the ability to reconfigure on-demand matters; this could be of particular interest in synthetic aperture integral imaging where in-situ reconfigurable optical components could help to enhance performance of the imaging device. Liquid lenses with variable focal length could form the basis of adaptive micro-scale optical elements in miniaturized integral 3D imaging and sensing devices.

Such tunable droplet micro-lenses exhibit differences in their macro-scale optical appearance, which can be used for the creation of patterns and images. Light scattering is generally more pronounced for droplets in the double emulsion geometry, while droplets with a flat internal interface induce much smaller perturbations in the propagating light wavefront. This allows for the creation of microscopic and macroscopic patterns with tunable contrast, which could form the basis for light field displays capable of creating 3D images and projecting variable information content into different directions.

Using halogenated liquids with high refractive index as constituents of the emulsion droplets could enable the formation of compound lenses with higher refractive power. This additional degree of freedom—the choice of emulsion formulation—could be used for correcting aberrations or for introducing a desired chromaticity. Incorporation of active optical media, plasmonic elements, or magnetic nanoparticles may open up a broad parameter space for tuning and controlling the fluid micro-lenses' dynamical optical properties, and simultaneously provide access to a multitude of enticing sensing paradigms and optical applications.

Methods

Droplet Formation

Double emulsion droplets were formed using a 1:1 volume ratio of heptane and Fluorinert FC-770 for the lensing experiments and a 1:1 volume ratio of (2:1 hexane:heptane) to FC-770 for the UV switchable droplets. For each of the two material combinations, the two fluids were combined in equal volumes and heated to just above the suspension's upper critical solution temperature $T_c$ to allow the two liquids to form a homogeneous mixture. An aqueous surfactant solution heated above $T_c$ was then added, and the resulting mixture was quickly shaken to form small multi-disperse droplets, which were left to cool to allow the constituent oils to phase separate. Mono-disperse droplets were formed in a glass capillary microfluidic device that consists of an outer square capillary (outer diameter, 1.5 mm, inner diameter, 1.05 mm, AIT Glass), and an inner cylindrical capillary (outer diameter, 1 mm, World Precision Instruments). The capillary assembly was pulled to form a 30 µm tip using a P-1000 Micropipette Puller (Sutter Instrument Company). Harvard Apparatus PHD Ultra syringe pumps were used to inject the homogenous mixture of fluorocarbon and hydrocarbon into the inner capillary and aqueous surfactant solution into the outer capillary. The microfluidic device and syringe pumps were maintained at a temperature above $T_c$ using a heat lamp while the drops were formed, and the drops were then cooled below $T_c$ to induce phase separation. The droplets were found to be stable on the timescale of several days, at least. It was believed that the droplets would stay stable for much longer, provided the aqueous medium and sample environment are optimized (see Supplementary Note 5, and Supplementary FIG. 6).

Determining the Curvature of the Internal Interface

The curvature of the internal interface between the droplets' hydrocarbon and fluorocarbon phases was determined with a custom-built microscope with horizontal axis that allowed capturing side views of the droplets. For these experiments, the droplets were placed onto a hydrogel substrate enclosed between two coverslips. The microscope consists of an Olympus 5× objective (NA=0.15), a Thorlabs tube lens (effective focal length=200 mm), and an OMAX 14.0MP Digital USB Microscope camera. A white screen was placed behind the sample, and the sample was illuminated from the side using a Fiber-Lite MI-152 lamp.

When viewing the internal interface between the fluorocarbon phase and the hydrocarbon phase, the image was distorted generally due to the curved outer phase. This distortion due to refraction at the droplet's outer surface was accounted for when determining the location and curvature of the droplet-internal interface. Therefore, the following correction was applied to find the position of an object—in this case a point on the internal interface—within a droplet of refractive index $n_1$ that is located in a medium with refractive index $n_2$: if the object is located at a distance h measured perpendicular to the optical axis, which passes the center of a sphere of radius R, the height of its image $h_1$ is given by the paraxial approximation:

$$h_i = h\frac{n_1}{n_2} \qquad (3)$$

This implies that the actual height h of an object in the droplet that appears to have a height $h_i$ may be:

$$h(h_i) = h_i\frac{n_2}{n_1} \qquad (4)$$

To deduce the actual droplet-internal interface location, this correction was applied by first determining the off axis distance $h_i$ for each point along the interface in the side view images of the drops using a custom MATLAB algorithm. Equation (4) was then used to calculate the real shape of the internal interface by fitting a circle to this corrected curve to determine the interface curvature.

Focus Scans

A custom-build microscope was used to reconstruct the light field behind the lenses. For this experiment, the drops were illuminated with a quasi-monochromatic plane wave. This was achieved by imaging the output of an optical fiber with 50 µm core in the back focal plane of a NPL 20× objective (Leitz Wetzlar, NA=0.45) used as a condenser. A 540 nm bandpass filter with an 80 nm bandwidth was used to create quasi-monochromatic light. The light field behind the droplets was captured by scanning the focal plane in 5 µm steps using a Madcity Labs micro-stage, a 20× Olympus objective (NA=0.75), a 200 mm focal length achromatic doublet tube lens, and an Andor Zyla sCMOS 5.5 Camera. The light field data was analyzed using MATLAB and ImageJ. The location and size of the droplets were determined from the images using ImageJ's measurement tools. The data from the focal scans was then entered into MATLAB to reconstruct the 3D light field behind individual droplet lenses, similar to the approach previously used to measure the light field behind retinal cell nuclei. After the light field was measured, the droplet lenses were placed in a microscope with horizontal optical axis and imaged from the side. This side view was used to determine the curvature and volume ratio of the drops.

Measuring Droplets' Focal Length

In order to quantify the image formation characteristics of the droplets, an image of a grid pattern was projected in front of them using a 60× Olympus water dipping objective (NA=1.0). The droplets acting as lenses projected the object to form a new image, which was then recorded using a 10× objective (NA=0.3) with a customized microscope setup (FIG. 5A). The distance of the input image $x_1$ to a droplet lens can be controllably varied, and the position of the projected image behind the lens $x_2$ is determined by locating the plane, where the projected image is in focus (FIGS. 5B-5D). The location of the input and recorded images are related to the focal length by the simple lens relation $$\frac{n_c}{s_i} + \frac{1}{s_o} = \frac{1}{f},$$

where $S_o$ and $s_i$ are the distances from the input image to the first principle plane and from the second principle plane to the recorded image, respectively, and $$n_c = \frac{n_{m_1}}{n_{m_2}}$$

is the refractive index contrast between the surrounding media before and after the droplet lens (in the measurement setup $m_1$ was water and $m_2$ was air). The focal length and principle plane locations ($p_1$ and $p_2$) could then be determined by measuring the location of the output image for various input image locations and by using the relation $$\frac{n_{water}}{x_1 - p_1} + \frac{1}{x_2 - p_2} = \frac{1}{f}, \quad (5)$$

where $x_1 - p_1 = s_i$, and $x_2 - p_2 = s_o$.

Determining the Droplets' PSF and MTF

The droplet lenses' point spread function (PSF) and modulation transfer function (MTF) provide quantitative measures of the two-point resolution and line pattern contrast limits that can be achieved when the lenses are employed in imaging applications. To get an estimate of the PSF, and MTF, individual droplets were exposed to white light, which originated from an optical fiber with a 50 µm diameter core and is collimated by a spherical lens (f=150 mm). The droplet's point spread function (PSF) was captured using a custom-build microscope composed of a 50× Olympus objective (NA=0.5), a Thorlabs tube lens (f=200 mm) and an Allied Vision ProSilica GT3300C camera. Only the camera's red channel was used (maximum quantum efficiency at 620 nm), expecting that the droplets' resolution would be at least comparable or better for smaller wavelengths. The MTF was obtained by Fourier-transforming the PSF after subtraction of background noise, removal of "salt and pepper" noise (due to hot pixels) using a median filter in a 3×3 pixel neighborhood area, and averaging over angular slices of the imaged Airy disk pattern.

Using UV Light to Switch Lens Morphology

With a light-sensitive surfactant containing an azobenzene moiety, 3-(4-((4-butylphenyl)diazenyl)phenoxy)-N,N,N-trimethylpropan-1-aminium bromide, in the aqueous medium, the fluid lenses can be switched from a transparent Janus state to a scattering double emulsion state, and back, simply by exposure to light in the UV and blue spectral ranges. The droplets consisted of a 1:1 volume ratio of (2:1 hexane:heptane) to FC-770 and a 100 µl total volume was used. The outer phase was composed of 600 µl of 0.1 wt % azobenzene surfactant and 80 µl of 2 wt % Zonyl FS-300 in water. A laser-printed photomask transparency displaying a smiley or the MIT logo was placed beneath the droplets in a dish on the stage of an inverted microscope. In the case of the MIT logo, a piece of semi-transparent Scotch table was placed over the "i" to partially block light transmission to the sample and to induce a grey-scaling effect. The sample of liquid lenses, initially in a Janus morphology, was then illuminated with UV light through the photomask (DAPI filter, λ=365 nm) to induce transformation of the droplets in the exposed areas to the double emulsion state. This light-induced reconfiguration of the lens-internal interface can be reversed by exposure to blue light (through a FITC filter, λ=470±20 nm). Gelatin can be added to the outer aqueous phase to reduce the rate of diffusion and prolong image persistency.

Optical Simulations

In all simulations, the overall droplet shape was assumed to be spherical, (assuming that the interfacial tensions $\gamma_{FH}$ between fluorocarbon and hydrocarbon, $\gamma_F$ between fluorocarbon and the aqueous medium, and $\gamma_H$ between hydrocarbon and the aqueous medium, satisfy the relations $\gamma_{FH} \ll \gamma_F \approx \gamma_H$). The internal interfaces were assumed to be spherical because, for example, interfaces between liquids can be considered to be spherical when the ratio of gravitational forces to surface tension forces is small. This ratio may be given by the Bond number $$Bo = \frac{\Delta \rho \cdot g \cdot L^2}{\gamma_{FH}},$$

where $\Delta_\rho$ is the difference in density of the two droplet phases, g the gravitational constant, and L the droplet diameter[57]. For a material system similar to the one used here, such as the hexane-perfluorohexane bi-phase droplets with a diameter of 100 µm, constituent densities of $$\rho_{HX} = 0.66 \frac{g}{cm^3} \text{ and } \rho_{FHX} = 1.68 \frac{g}{cm^2},$$

and a surface tension $$\gamma_{FH} = 0.4 \frac{mN}{m},$$

the Bond number is around 0.25. While a Bond number of around 0.1 is usually considered to be an upper limit for assuming spherical curvature of a liquid-liquid interface, images of these complex droplets show that the interface of the droplets obtained can be approximated reasonably well with a spherical fit (inset in FIG. 5E). Deviations are apparent closer to the triple-phase contact line, but these regions do not strongly affect the optical behavior of the droplet lenses.

Finite difference time domain simulations were completed using the open source software package MIT Electromagnetic Equation Propagation (MEEP). Double emulsions and Janus droplets of Heptane ($n_H$=1.387) and FC-770 ($n_F$=1.27) with a radius of 5 µm in water ($n_W$=1.33) were illuminated with a 500 nm wavelength monochromatic line light source. Equal volumes of Heptane and FC-770 were simulated, and the overall droplet shape and the shape of the interface were assumed to be spherical, such that Eq. 1 yields the interface location. A perfectly matched layer (PML) was used as the boundary condition on all edges of the cell, and the resolution was 32 units per µm. The simulation was run until a steady state was reached where the intensity no longer varied between time steps.

Ray-tracing was implemented in MATLAB. Each ray was defined by its location, direction, intensity, and polarization. The rays were propagated to the drop and were refracted and reflected at each interface of the drop. The direction vector $\vec{d}_t$ of the refracted ray was determined using a vector version of Snell's law:

$$\vec{d}_t = \frac{n_1}{n_2}\vec{d}_i + \left(\frac{n_1}{n_2}\cos(\theta_i) - \sqrt{1 - \left(\frac{n_1}{n_2}\right)^2\left[1 - \cos^2(\theta_i)\right]}\right)\vec{n} \quad (6)$$

where $\vec{d}_i$ is the direction of the incident ray, $\vec{n}$ is the surface normal, $\theta_i$ is the angle that the incoming ray makes with the surface normal, and $n_1$ and $n_2$ are the refractive indices before and after the interface. The intensity of the refracted and reflected rays were calculated using the Fresnel Equations[46].

The ray transfer matrix was calculated numerically using MATLAB. The transfer matrix consisted of the product of transfer matrixes for a ray entering the drop (water to heptane), propagating a distance $R_d+l$ to the interface between heptane and FC-770, being refracted at this interface, propagating the rest of the way through the drop, and being refracted at the outer interface of the drop (FC-770 to water). In order to compare with experiments, refraction through the coverslip after the drop was included in the ray transfer matrix. The locations of the focal points were consistent between the ray transfer matrix and ray-tracing.

The morphology of the droplet with heptane as the internal phase is determined by the surface tensions of the various liquids and the volume ratio $$v_r = \frac{V_H}{V_F},$$

where $V_H$ is the volume of heptane and $V_F$ the volume of FC-770. If the overall droplet is considered to be spherical, then the volume of heptane is:

$$V_H = \frac{v_r}{1+v_r}V_{drop} = \frac{v_r}{1+v_r}\frac{4}{3}\pi R_d^3, \quad (7)$$

with $R_d$ being the droplet radius (FIG. 7). The location of the interface was determined from the internal curvature $R_i$, by noting that the volume of heptane is equal to the volume of region A plus the volume of region B, each of which can be obtained by calculating the volumes of the spherical caps:

$$V_H = V_A + V_B = \frac{\pi}{3}h_A^2(3R_d - h_A) + \frac{\pi}{3}h_B^2(3R_i - h_B) \quad (8)$$

The height of the spherical caps was determined by the distance from the center of the droplet to the plane of the three-phase contact line h, such that:

$$h_A = R_d - h \text{ and } h_B = l + h. \quad (9)$$

The location of the three-phase contact line is the intersection of the sphere forming the internal interface with the sphere that defines the overall droplet. In other words, $$r^2 + h^2 = R_d^2 \text{ and } r^2 + (d-h)^2 = R_i^2, \quad (10)$$

where d is the distance from the center of the droplet to the center of the sphere that defines the internal interface.

Combining Eqs. 7-9 and eliminating r, h, $h_A$, $h_B$, and d, yields Eq. 1.

In the limit that $\gamma_{FH} \ll \gamma_F \approx \gamma_H$, it has been shown that the contact angles at the three phase contact line are $$\frac{\gamma_H - \gamma_F}{\gamma_{HF}} = \cos(\theta_F) = -\cos(\theta_H), \quad (11)$$

which by applying the law of cosines yields Eq. 2.

Determination of the Focal Length from the Image-Object Locations

In order to determine the droplets' focal length, a pattern was projected in front of the droplets and used as the "object". The image formed by the drops (the "image") was recorded. By varying the location of the object, the image location can be varied, allowing us to determine the focal length of the drops. A common form of the standard thick lens equation was used to find the focal length, accounting for the fact that the droplet-coverslip system formed a boundary between two different refractive index media, as shown in FIG. 8A.

Consider an object of height $h_o$ located at a distance $x_1$ from the center of the droplet. For a thick lens system, all refraction can be considered to happen at the principal planes, such that a ray passing through the optical axis at the first principal plane (red ray in FIG. 8A) will be refracted according to Snell's law, which in the paraxial approximation is given by:

$$n_1\theta_1 = n_2\theta_2.$$

with $n_1$, $n_2$ and $\theta_1$, $\theta_2$ being the refractive indices and angles of the incident and refracted rays with the interface normal for medium 1 and 2, respectively. This can also be written in terms of the object and image heights $h_o$, $h_i$, the distance of the object to the first principal plane $s_o$, and the distance of the image to the second principal plane $s_i$:

$$n_1 \frac{h_o}{s_o} = n_2 \frac{-h_1}{s_i}. \quad (12)$$

A ray that hits the first principal plane parallel to the optical axis will be refracted at the second principal plane and pass through the back focal point, which gives $$\frac{h_o}{f} = -\frac{h_i}{s_i - f}, \quad (13)$$

with f being the focal length measured in the second medium. Combining Eqs. 12 and 13 yields a modified version of the lens equation:

$$\frac{n_1}{n_2}\frac{1}{s_o} + \frac{1}{s_i} = \frac{1}{f}.$$

In terms of the measured distances from the center of the droplet, this yields:

$$\frac{n_1}{n_2}\frac{1}{x_1-p_1}+\frac{1}{x_2-p_2}=\frac{1}{f}, \quad (14)$$

where $p_1$ and $p_2$ are the distances from the droplet center to the first and second principal planes, which were used as fitting parameters when determining the focal length of the droplets, as shown in FIG. 8B.

Correction to Interface Shape Due to Refraction at Droplet Interface

When the interface between the two liquids is imaged through the outer phase of the droplet, the image of the interface may be magnified. In order to correct for the magnification, the paraxial approximation was used. Consider an object of height h located inside of a sphere of radius R and refractive index $n_1$, which is positioned inside a medium of refractive index $n_2$, as shown in FIG. 10. A ray leaving the object at an angle $\alpha$ may hit the interface of the drop at a height $\alpha$=h–R$\alpha$ (under the assumption $\alpha \ll 1$). At this height, the surface normal is at an angle $$\frac{a}{R}=\frac{h}{R}+\alpha,$$

such that the ray hits the surface at an angle $$\theta_1 = \frac{h}{R}+\alpha-\alpha=\frac{h}{R} \quad (15)$$

for all rays with $\alpha \ll 1$. Each ray is refracted according to Snell's law:

$$\theta_2 = \frac{n_1}{n_2}\theta_1 = \frac{n_1}{n_2}\frac{h}{R} \quad (16)$$

Similarly, the height were all the rays converge (the image is formed) is given by:

$$h_i = R\theta_2 = \frac{n_1}{n_2}h. \quad (17)$$

Snell's law was used in the free software package Geogebra to determine the image height of an object located inside a droplet of refractive index $n_1$=1.39 (heptane) in a medium of refractive index $n_2$=1.33 (water). FIGS. 11A-11B shows how the magnification depends on image height. For a small object, the magnification matches that of the paraxial approximation, but diverges for larger objects. For an object of 0.9 times the radius of the droplet, the error resulting from the paraxial approximation was less than 0.3%, which is significantly smaller than the uncertainty in the location of the interface (line thickness) in the images.

Vector Form of Snell's Law for Ray Tracing

The ray tracer that was implemented in MATLAB uses Snell's Law in vector form in order to unambiguously determine the direction of each ray after it was refracted through a surface. Consider a ray traveling along a vector $\vec{d}_1$ refracting through a surface with normal $\vec{n}$. The incidence angle $\theta_1$ is given by the angle between the propagation vector $\vec{d}_1$ and the surface normal $\vec{n}$. The vector $\vec{d}_1$ of the incident light can be broken down into components tangential ($\vec{t}$) and normal ($\vec{n}$) to the surface:

$$\vec{d}_1 = \sin(\theta_1)\vec{t} + \cos(\theta_1)\vec{n}. \quad (18)$$

Similarly the propagation vector $\vec{d}_2$ of the outgoing ray can be written as $$\vec{d}_2 = \sin(\theta_2)\vec{t} + \cos(\theta_2)\vec{n}, \quad (19)$$

where $\mu_2$ is the angle between $\vec{d}_2$ and $\vec{n}$.

The tangential vector $\vec{t}$ can be determined from Eq. 18:

$$\vec{t} = \frac{\vec{d}_1 - \cos(\theta_1)\vec{n}}{\sin(\theta_1)} \quad (20)$$

The outgoing angle $\theta_2$ can be determined from Snell's law:

$$n_1 \sin(\theta_1) = n_2 \sin(\theta_2). \quad (21)$$

Using the trigonometric identity $\sin^2\theta + \cos^2\theta = 1$ Snell's Law can be written as $$\cos^2(\theta_2) = \sqrt{1 - \left(\frac{n_1}{n_2}\right)^2[1-\cos^2(\theta_1)]} \quad (22)$$

Substituting Eqs. 20-22 into Eq. 19 yields the vector form of Snell's law $$\vec{d}_2 = \frac{n_1}{n_2}\vec{d}_1 + \left(\frac{n_1}{n_2}\cos(\theta_1) - \sqrt{1 - \left(\frac{n_1}{n_2}\right)^2[1-\cos^2(\theta_1)]}\right)\vec{n}$$

Droplet Stability

The solubility of hexane, heptane, and FC770 is generally extremely low in water; however, over sufficiently long time scales, diffusion of hexane or heptane through the aqueous medium into the ambient environment can lead to changes in droplet morphology. This may be prevented by keeping the droplets and the medium in a closed environment and by suppressing diffusion into the aqueous medium, which can be achieved through priming with the respective solvent. FC770, a long-chain fluorinated oil, was not found to diffuse into the aqueous medium on the timescale of days. FIG. 12A visualizes droplet morphology variation in suboptimal experiment condition, while FIGS. 12A-12B shows that the droplets are stable, if the experimental conditions are appropriately controlled. For the heptane-FC770 droplets shown in the figure, the sample chamber was sealed to prevent any exchanges with the ambient environment and saturate the aqueous medium with heptane, to avoid heptane diffusion from the droplets into the medium.

Example 2

The following example relates to a general method to create fluorescent based detection of biological species. This includes reactive dynamic surfactants wherein binding to a biological species physically removes elements connected through dynamic covalent bonds. For example, this is different from a previous investigations that included enzyme activity to change the surfactants. The detection of biomarkers, carbohydrates, have been demonstrated that can be bound to liquid colloids and pathogens that remove bound biomolecules from the organic-water interface. The ability to detect the pathogen *Salmonella* has also been demonstrated and this method can be extended to detect virtually any cellular organism or virus. Detection of protein-protein interactions are also possible by this method. The latter could have implications for discovering drugs that mediate these processes.

Herein, reconfigurable double emulsion micro-droplets can be utilized as morphology-dependent optical elements producing directional fluorescent signals that function as a versatile novel pathogen sensing platform. Sensory droplets have a fluorescent dye in the higher refractive index hydrocarbon phase, and a portion of the emitted light undergoes total internal reflection at the internal fluorocarbon/hydrocarbon interface leading to a characteristic anisotropic angular morphology dependent distribution in the intensity of fluorescently emitted light. The interplay between the droplets' emissive optical response and morphology enables a unique sensitive and selective detection scheme for carbohydrates and *Salmonella* cells.

For this study, hydrocarbon and fluorocarbon oils with a large refractive index contrast were employed, toluene (RI=1.49) and a mixture of 2-trifluoromethyl-3-ethoxyperfluorohexane (HFE-7500) and heptacosafluorotributylamine (FC-43) (RI=1.29). Polydisperse complex emulsion droplets with these solvents are readily obtained by bulk emulsification in water (RI=1.33) at temperatures above the HC/FC upper critical solution temperature (32° C.). The droplet structures (FIG. 3C) were controlled by balancing sodium dodecylsulfate (SDS) and Zonyl FS-300 surfactant concentrations. To enable a highly reproducible and consistent emission behavior, monodisperse droplets using microfluidic processing were prepared at elevated temperatures.

Double emulsion droplets are tunable lenses with optical properties that vary with the droplet morphology. The refractive index contrast and curvature of each interface contributes, without wishing to be bound by theory, to the lenses' ability to focus or scatter light and depends on the configuration of the internal interface. By adding of a fluorescent dye to the hydrocarbon phase, wherein the higher refractive index allows for total internal reflection and optical confinement, droplets with a tunable emission signature that varies strongly in response to morphological changes were formed. In particular, light emitted at high enough angles with respect to the hydrocarbon (high-refractive index)-fluorocarbon (low refractive index) internal interface undergoes total internal reflection and is guided along the interface before exiting the droplet at the water/hydrocarbon interface near the three-phase contact line at an angle that is highly dependent on the droplet morphology.

A ray diagram capturing the emission characteristics of a FC/HC/W emulsion droplet with fluorescent dye in the hydrocarbon phase is shown in FIG. 14A. The emission of the complex droplets was modeled using standard raytracing techniques. To approximate a continuous fluorescing medium, 20,000,000 rays per unit volume were used. Starting directions, locations, and polarizations of rays were initialized homogeneously and randomly within the hydrocarbon phase. Individual ray trajectories were determined using a custom non-sequential raytracing algorithm in MATLAB and the intensity of the output rays was collected to 1° bins. Rays 1 and 2 in FIG. 14A represent light rays that intersect the hydrocarbon/fluorocarbon interface at an angle less than the critical angle for total internal reflection, $\theta_c=\sin^{-1}(n_{FC}/n_{HC})=60°$; a fraction of that light is reflected while the rest transmits through the interface. This transmitted light, which is, in some cases, present in droplet morphologies is simply treated as background emission. Other rays, such as Rays 3 and 4 in FIG. 14A, intersect the internal interface at an angle larger than the critical angle $\theta_c$. These rays are guided along the interface by total internal reflection until they encounter the hydrocarbon/water interface, where they can escape the droplet (Ray 3) or continue to be totally internally reflected (Ray 4), depending on the droplet's geometry and the refractive index contrast. In the case of a fully encapsulated HC in FC double emulsion (FC/HC/W), the optical field can extend via frustrated total internal reflection across the thin interface at the top of the droplet and light leaks out. A portion of the totally internally reflected (TIR) light is also re-adsorbed by other dye molecules. However, after slightly 'opening up' the droplet and exposing the HC/W interface, a significantly higher amount of the total internally reflected light exits the droplet as a result of the higher refractive index of the continuous water phase as compared to the fluorocarbon phase. Variations in the contact angle of the three-phase contact line lead to changes in the angle at which the TIR light escapes the droplet through the HC/W interface, allowing increased out-coupling of light and a more vertically directed emission. A further change in morphology towards a Janus state results in wider angles of emission. These calculations reveal that large emission intensity differences can be measured in the vertical direction of gravity-aligned emulsion droplets.

Experimental realization of these morphology-dependent emission effects was accomplished by adding perylene to the hydrocarbon phase to create emissive emulsion droplets. FIG. 14C shows side view optical micrographs of fluorescent droplets for comparison to the raytracing computations. Large variations in the light intensity at the three-phase junction provided evidence of the proposed morphology-dependent variations of the droplets' emission. In addition, a top-view image (FIG. 14D, right) shows the predicted high emission along the gravitational axis and the bright ring where TIR light exits the drop.

Based on these theoretical and experimental results, it was anticipated that the intensity of emitted light measured directly above a monolayer of droplets that are all aligned due to gravity should vary strongly with the droplet morphology. To experimentally verify this prediction, a bifurcated fiber connected to a spectrometer was positioned in vertical position above monolayers of emulsion droplets deposited on glass slides. In this configuration, the fiber is used for both excitation of the fluorescent droplet phase and collection of emitted light (FIG. 15A). The intensity of light emitted by droplet monolayers in the direction of the sample surface normal for different morphologies was recorded, which were adjusted by varying the ratio of hydrocarbon (SDS) and fluorocarbon (Zonyl FS-300) surfactants in the continuous phase. Side view images of the respective droplet configurations were obtained for each surfactant ratio to determine the contact angle of the three-phase junction. In parallel, to provide a theoretical comparison, the intensity of light emitted in a cone matching the collection fiber's numerical aperture (NA=0.22) and orientation was modeled and integrated. FIG. 15B reveals excellent agreement between the experimentally observed light intensities and the theoretical predictions, thereby establishing the utility of a ratiometric optical read-out strategy to determine small changes in the droplet morphology. For a droplet morphology leading to a horizontal focus of the TIR-portion of the emission a minimum in the emission intensity is measured in the vertical position (contact angle: ~16°). Minimal further expansion of the HC/W interface results in a rapid, almost linear increase of the light intensity until a maximum is reached. This maximum corresponds to the morphology where the majority of totally internally reflected light is directed in the vertical direction (the morphology shown in the third image of FIG. 14B; contact angle: 25°). Upon passing the maximum, a further increase of the contact angle results in a pronounced emission intensity decrease as the droplet morphology progresses to the Janus state.

Having established the light curve (L-Curve) in FIGS. 15A-15B, the chemical-structural-optical coupling in fluorescent double emulsion droplets was used to enable a new carbohydrate sensing paradigm. Boronic acid co-surfactants were designed that localize at the hydrocarbon/water interface. Specifically, complex HC/FC droplets were prepared with synthesized 3,4-dibutoxyphenyl-boronic acid (B(OH)$_2$ 1) and the surfactant block-co-polymer polystyrene-block-poly(acrylic acid-co-acrylamidophenyl-boronic acid) (B(OH)$_2$ 2) solubilized in the hydrocarbon phase (FIG. 16A). Since the added boronic acids 1 and 2 behave as surfactants, the maximum emission intensity peak on the L-Curve shifts to higher Zonyl/SDS ratios (i.e. less SDS is needed), as shown in FIG. 16B. Reactions of carbohydrates with the boronic acids at the droplet interface (FIG. 16C) increased the surfactant effectiveness and lower the HC/W interfacial tension even further. Hence, at a given Zonyl/SDS concentration, carbohydrates triggered a droplet morphology change towards the Janus state. As a result, changes in carbohydrate concentration are detected by monitoring changes in droplet emission intensity.

To implement a specific carbohydrate sensing approach, the droplet morphology was first adjusted by balancing the concentration of boronic acids in the droplet and Zonyl in the water phase to a state that gives maximum emission intensity. This state was recorded as the 'active' state wherein the highest amount of emitted light is directed into the collection fiber. It was established that fructose displays highest binding constants with phenyl-boronic acids and therefore this monosaccharide was chosen as a starting point. The addition of μg/mL of fructose to B(OH)$_2$ 1 functionalized droplets leads to a reduction in the hydrocarbon/water interfacial tension to "open up" the HC/W interface (FIG. 16C), changing the morphology from a nearly encapsulated HC phase toward a Janus configuration. This morphology change was monitored by recording the decrease in emission intensity (FIG. 16D). Similarly, the addition of glucose and mannose changes the interfacial tensions. As a result of the smaller association constants of the latter with phenyl boronic acids, the concentrations needed to induce a maximum morphology change were higher. At low sugar concentrations (below 50 microg/mL) the calibration curves for these simple sugars are relatively linear and provide precise detection of fructose ($R^2$=0.982), glucose ($R^2$=0.991), and mannose ($R^2$=0.980) (FIG. 16E). The addition of monosaccharides to droplets containing B(OH)$_2$ 2 resulted in a likewise decrease of the emission intensity as a result of a morphology change. In this scheme, the differences in binding affinities of the boronic acid functionality with monosaccharides were less pronounced (FIG. 16F), potentially as a result of multiple binding interactions of the polymeric B(OH)$_2$ 2 surfactant with the monosaccharides. Similarly, linear calibration curves for fructose ($R^2$=0.983), glucose ($R^2$=0.997), and mannose ($R^2$=0.994) revealed that B(OH)$_2$ 2 allows for a precise detection of low monosaccharide concentrations (FIG. 16G).

In some cases, a binding of larger and more complex carbohydrates at the HC/W interface can produce even larger morphology changes. Consistently the polysaccharide mannan, a polymer of β-1,4-linked mannose subunits, gabe a significantly larger change in droplet morphology as a result of its increased size and hydrophilicity, as well as its stronger multivalent binding to the interface. As shown in FIGS. 16D and 16F, the addition of mannan results in the most pronounced morphology change away from the 'active' state towards a perfect Janus morphology. Consistently, much lower concentrations (<30 microg/mL) of the polysaccharide mannan were needed to reach a maximum decrease in the L-Curve emission intensity (−45%).

Carbohydrates can be used as recognition elements for pathogen detection and thus *Salmonella enterica* serovar *Typhimurium* was targeted, one of the main foodborne pathogen responsible for human gastroenteritis. The FimH proteins present on the pilli of the *Salmonella* bacteria have a high affinity for mannose units. Hence, it was hypothesized that competitive binding could remove carbohydrates from the HC/W interface leading to a reverse emission intensity change along the L-Curve back to the original 'active' state. Emission intensity measurements in combination with side-view images of the double-emulsion droplets provided evidence of this *Salmonella*-induced morphology change (FIGS. 17A-17G). Upon addition of heat-killed *Salmonella enterica* serovar *Typhimurium* (HKST) cells, the complex emulsion droplets displayed an immediate exponential increase towards the maximum emission intensity. Using B(OH)$_2$ 1-Mannan functionalized droplets, concentration- and time-dependent monitoring of the emission intensity revealed a detection limit of <10$^4$ cells/mL in less than 2 hours. The polymeric spacer present in the B(OH)$_2$ 2 surfactant polymer allowed for a more rapid detection of HKST in less than one hour, which was attributed to the less diffusion-hindered accessibility of these sugar-substituted complex emulsions. To increase the specificity of the bacteria interaction we opted for an oriented immobilization of anti-*Salmonella Typhimurium* IgG antibodies at the HC/W interface via the boronate ester sugar binding scheme. IgG antibodies possess N-glycans as part of their backbone, the Fc-region of the antibody. This approach entails several advantages such as leaving the binding sites available for antigen binding as well as no necessity for prior antibody modification. For the reversible immobilization of these antibodies at the HC/W interface the flexibility of the surfactant and the spacer in between the interface and the B(OH)$_2$ binding site was found to be necessary. Therefore the polymeric B(OH)$_2$ 2 surfactant was used for the reversible immobilization of the antibodies (FIG. 17D). Confocal microscope images of droplets functionalized with a FITC-dye labeled IgG-antibody gave evidence of the successful immobilization at the interface (FIG. 17E). The hydrophilicity and the size of the antibodies allowed for pronounced morphology changes that were tracked via recording the emission intensity along the L-Curve. As found, 25 microg/mL of anti-*Salmonella Typhimurium* antibody led to a decrease in the emission intensity of −19%.

Addition of HKST cells to these antibody-functionalized complex emulsions led, in turn, to a rapid increase of the emission intensity back to the original highest light intensity on the L-Curve. The strong and specific interactions with *Salmonella* bacteria remove the antibodies from the droplet interface and results in our most sensitive detection of *Salmonella* bacteria with detection limits below 100 cells/mL. Hence, a simple recording of the directional emission intensity of these dynamic liquid colloids has enabled the creation of a new, simple and inexpensive platform for the rapid, sensitive, and selective detection of this common foodborne pathogen.

In summary, a new sensing paradigm that takes advantage of the unique chemical-structural-optical coupling in chemically functionalized fluorescent double emulsion droplets was demonstrated. Specifically, the phenomenon of total internal reflection of light that was emitted in the higher refractive index hydrocarbon phase from the internal hydrocarbon/fluorocarbon interface was exploited. The emission direction of the totally internally reflected light is generally dependent on the curvature of the internal interface and hence allows for the detection of miniscule changes in the droplet morphology. The strong correlation between experimental data and theoretical raytracing models provides for an understanding of the optical phenomena underlying the change in emission characteristics in response to droplet morphology variations. Stimuli-responsive boronic acid surfactants were employed to selectively bind mono- and polysaccharides, as well as N-glycans present in IgG antibodies and the associated changes in the hydrocarbon/water interfacial tension were detected optically. These dynamic interface triggered morphology changes were used to create a rapid and highly sensitive method for the detection of the sugar-binding foodborne pathogen *Salmonella enterica* serovar *Typhimurium*. This new efficient sensing platform facilitates the early detection of foodborne pathogens and thereby can help to reduce food poisoning around the globe.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a plurality of droplets dispersed within an outer phase, wherein:
the plurality of droplets comprise a first component and a second component immiscible with the first component under a first set of conditions,
the plurality of droplets have a first average radius of curvature between the first component and the second component that causes light rays to have a first emission intensity at a given emission direction under the first set of conditions, and the plurality of droplets have a second average radius of curvature between the first component and the second component that causes light rays to have a second emission intensity at the given emission direction, different than the first emission intensity, under a second set of conditions, different than the first set of conditions.

2. An article, comprising:

a plurality of droplets dispersed within an outer phase, wherein:

the plurality of droplets comprise a first component and a second component immiscible with the first component under a first set of conditions, the plurality of droplets have a first average radius of curvature between the first component and the second component that causes light rays to have a first angle of maximum emission intensity under the first set of conditions, and the plurality of droplets have a second average radius of curvature between the first component and the second component that causes light rays to have a second angle of maximum emission intensity, different than the first angle, under a second set of conditions, different than the first set of conditions.

3. An article as in claim 2, wherein at least a portion of the plurality of droplets are aligned.

4. An article as in claim 2, wherein the plurality of droplets comprise a surfactant comprising boronic acid.

5. A device as in claim 2, wherein the plurality of droplets comprise a dye.

6. A device as in claim 2, wherein the first component comprises a first dye and the second component comprises a second dye, different than the first dye.

7. A device as in claim 2, wherein the plurality of droplets are configured to detect carbohydrates and/or pathogens such as *Salmonella*.

8. A device as in claim 2, wherein the plurality of droplets are configured to reversibly bind, at a surface of the droplets, to an analyte such that the act of binding or unbinding of the analyte changes the average focal length of a transmitted light through the plurality of droplets.

9. A device as in claim 2, wherein the plurality of droplets are configured to reversibly bind, at a surface of the droplets, to an analyte such that the act of binding or unbinding of the analyte changes a direction of light emission from the plurality of droplets.

* * * * *